US006545088B1

(12) United States Patent
Kolthammer et al.

(10) Patent No.: US 6,545,088 B1
(45) Date of Patent: Apr. 8, 2003

(54) METALLOCENE-CATALYZED PROCESS FOR THE MANUFACTURE OF EP AND EPDM POLYMERS

(75) Inventors: Brian W. S. Kolthammer, Lake Jackson, TX (US); Robert S. Cardwell, Lake Jackson, TX (US); Deepak R. Parikh, Lake Jackson, TX (US); Morris S. Edmondson, Alvin, TX (US); Stanley W. Smith, Lake Jackson, TX (US)

(73) Assignee: Dow Global Technologies Inc., Midland, MI (US)

(*) Notice: Subject to any disclaimer, the term of this patent is extended or adjusted under 35 U.S.C. 154(b) by 1296 days.

(21) Appl. No.: 08/679,538

(22) Filed: Jul. 12, 1996

Related U.S. Application Data

(63) Continuation-in-part of application No. 08/592,756, filed on Jan. 26, 1996, now abandoned, which is a continuation-in-part of application No. 08/208,068, filed on Mar. 8, 1994, now abandoned, which is a continuation of application No. 07/815,716, filed on Dec. 30, 1991, now abandoned.

(51) Int. Cl.[7] .............................. C08F 2/14; C08F 4/643; C08F 210/18; C08F 297/08
(52) U.S. Cl. ..................... 525/53; 525/232; 525/322; 525/324; 526/126; 526/134
(58) Field of Search .................. 525/232, 53, 322; 525/324; 526/134, 126

(56) References Cited

U.S. PATENT DOCUMENTS

| | | | |
|---|---|---|---|
| 3,485,706 A | 12/1969 | Evans et al. ................... 161/72 |
| 4,075,287 A | 2/1978 | Scoggin .................. 260/878 B |
| 4,078,131 A | 3/1978 | de Zarauz ..................... 526/20 |
| 4,094,942 A | 6/1978 | Nakai et al. ................ 264/102 |
| 4,102,761 A | 7/1978 | Bohm et al. ............. 204/159.2 |
| 4,125,699 A | 11/1978 | Yamamoto et al. ....... 526/169.2 |
| 4,182,810 A | 1/1980 | Wilcox ......................... 526/64 |
| 4,184,027 A | 1/1980 | Hopkins ...................... 526/60 |
| 4,200,722 A | 4/1980 | Pennings et al. ............ 526/282 |
| 4,243,773 A | 1/1981 | Arnaud et al. ............... 525/387 |
| 4,258,158 A | 3/1981 | Pfeiffer ........................ 526/68 |
| 4,259,468 A | 3/1981 | Kajiura et al. .............. 526/283 |
| 4,340,563 A | 7/1982 | Appel et al. ................ 264/518 |
| 4,413,110 A | 11/1983 | Kavesh et al. ........... 526/348.1 |
| 4,433,121 A | 2/1984 | Kabu et al. ................... 526/68 |
| 4,663,220 A | 5/1987 | Wisneski et al. ........... 428/221 |
| 4,668,566 A | 5/1987 | Braun ......................... 428/286 |
| 4,701,432 A | 10/1987 | Welborn, Jr. ................ 502/113 |
| 4,722,971 A | 2/1988 | Datta et al. ................. 525/211 |
| 4,792,595 A | 12/1988 | Cozewith et al. ........... 526/348 |
| 4,804,794 A | 2/1989 | Ver Strate et al. ............ 585/12 |
| 4,931,517 A | 6/1990 | Fujita ......................... 526/128 |
| 5,001,205 A | 3/1991 | Hoel ........................... 526/128 |
| 5,017,665 A | 5/1991 | Chang ........................ 526/129 |
| 5,055,438 A | 10/1991 | Canich ........................ 502/117 |
| 5,057,475 A | 10/1991 | Canich ........................ 502/104 |
| 5,064,802 A | 11/1991 | Stevens et al. .............. 502/155 |
| 5,084,534 A | 1/1992 | Welborn, Jr. et al. ....... 526/160 |
| 5,096,867 A | 3/1992 | Canich ........................ 502/103 |
| 5,118,773 A | 6/1992 | Takso et al. ................. 523/282 |
| 5,132,380 A | 7/1992 | Stevens et al. .............. 526/126 |
| 5,147,949 A | 9/1992 | Chang ........................ 526/129 |
| 5,153,157 A | 10/1992 | Hlatky et al. ............... 502/117 |
| 5,189,192 A | 2/1993 | LaPointe et al. .............. 556/11 |
| 5,198,401 A | 3/1993 | Turner et al. ................ 502/155 |
| 5,229,022 A | 7/1993 | Song et al. .................... 252/56 |
| 5,229,478 A | 7/1993 | Floyd et al. ................. 526/160 |
| 5,231,106 A | 7/1993 | Knutsen et al. .............. 514/340 |
| 5,240,894 A | 8/1993 | Burkhardt et al. .......... 502/108 |
| 5,241,025 A | 8/1993 | Hlatky et al. ............... 526/129 |
| 5,242,971 A | 9/1993 | Nakahama et al. ......... 524/526 |
| 5,264,405 A | 11/1993 | Canich ........................ 502/103 |
| 5,272,236 A | 12/1993 | Lai et al. .................. 526/348.5 |

(List continued on next page.)

FOREIGN PATENT DOCUMENTS

| | | | | |
|---|---|---|---|---|
| EP | A 277003 | 8/1988 | ............. C08F/4/64 |
| EP | 0 347 129 B1 | 12/1989 | ......... C08F/210/18 |
| EP | 416815 | * | 3/1991 | |

(List continued on next page.)

OTHER PUBLICATIONS

*Polymer Letters*, vol. 6, pp. 621–624 (1968), "The Construction of a Polyethylene Calibration Curve for Gel Permeation Chromatography Using Polystyrene Fractions" by T. Williams and I.M. Ward.

*Organometallics*, 1994, vol. 13, pp. 2430–2443, "Silyl Cations in the Solid and in Solution", by Joseph B. Lambert, Shizhong Zhang, and Sol M. Ciro.

*J. Chem. Soc. Chem. Communication*, 1993, pp. 383 and 384, "Tetrakis(pentafluorophenyl)borate: a New Anion for Silulium Cations in the Condensed Phase", by Joseph B. Lambert and Shizhong Zhang.

Primary Examiner—D. R. Wilson
(74) Attorney, Agent, or Firm—Whyte Hirschboeck Dudek SC

(57) ABSTRACT

Ethylene, an α-olefin and, optionally, a diene monomer are polymerized in a process comprising the step of contacting (1) ethylene, (2) at least one $C_3$–$C_{20}$ aliphatic α-olefin, (3) optionally, at least one $C_4$–$C_{20}$ diene, (4) a catalyst comprising (a) a metallocene complex, and (b) an activator, and (5) a solvent. The process is conducted in either a single reactor or in multiple reactors, the latter configured either in series or parallel. Solvent is removed from the polymer stream in an anhydrous, first stage solvent recovery operation such that the solids concentration of the product stream is increased by at least 100 percent. Additional solvent is removed in an anhydrous, second stage solvent recovery operation from the product of the first stage solvent recovery operation such that the solids concentration of the product stream is in excess of 65 weight percent.

12 Claims, 6 Drawing Sheets

U.S. PATENT DOCUMENTS

| | | | |
|---|---|---|---|
| 5,278,119 A | 1/1994 | Turner et al. | 502/155 |
| 5,278,272 A | 1/1994 | Lai et al. | 526/348.5 |
| 5,296,433 A | 3/1994 | Siedle et al. | 502/117 |
| 5,304,164 A | 4/1994 | Lindsay | 604/403 |
| 5,318,849 A | 6/1994 | Mehalla et al. | 428/407 |
| 5,321,106 A | 6/1994 | LaPointe | 526/126 |
| 5,374,696 A | 12/1994 | Rosen et al. | 526/126 |
| 5,374,700 A | 12/1994 | Tsutsui et al. | 526/348.3 |
| 5,408,017 A | 4/1995 | Turner et al. | 526/134 |
| 5,449,713 A | 9/1995 | Nakahama | 524/491 |
| 5,453,410 A | 9/1995 | Kolthammer et al. | 502/155 |
| 5,464,905 A | 11/1995 | Tsutsui et al. | 526/240 |
| 5,470,993 A | 11/1995 | Devore et al. | 556/11 |
| 5,478,898 A | 12/1995 | Standaert | 526/65 |
| 5,486,632 A | 1/1996 | Devore et al. | 556/11 |
| 5,519,091 A | 5/1996 | Tsutsui et al. | 525/240 |
| 5,610,254 A | 3/1997 | Sagane et al. | 526/282 |
| 5,677,382 A | 10/1997 | Tsuji et al. | 525/237 |
| 5,681,799 A | 10/1997 | Song et al. | 508/454 |
| 5,696,213 A | 12/1997 | Schiffino et al. | 526/158 |

FOREIGN PATENT DOCUMENTS

| | | | | |
|---|---|---|---|---|
| EP | A 468651 | 1/1992 | | C08F/4/74 |
| EP | A 514828 | 11/1992 | | C07F/7/28 |
| EP | A 520732 | 12/1992 | | C08B/10/00 |
| EP | 0 552 945 B1 | 7/1993 | | C08F/10/00 |
| EP | 0 570 982 A1 | 11/1993 | | C08F/10/00 |
| EP | 0 612 768 A1 | 8/1994 | | C08F/210/16 |
| EP | 0 668 295 A1 | 8/1995 | | C08F/2/44 |
| EP | 0 702 038 A1 | 3/1996 | | |
| EP | 0 743 066 A2 | 11/1996 | | A61K/31/505 |
| WO | 90-03414 | * 5/1990 | | |
| WO | WO 91/01337 | 2/1991 | | C08F/210/02 |
| WO | WO 91/04257 | 4/1991 | | C07F/7/00 |
| WO | WO 92/15619 | 9/1992 | | |
| WO | WO 93/08221 | 4/1993 | | C08F/10/00 |
| WO | WO 93/11171 | 6/1993 | | C08F/10/00 |
| WO | WO 93/13143 | 7/1993 | | |
| WO | WO93/19104 | 9/1993 | | C08F/10/00 |
| WO | WO 93/25590 | 12/1993 | | C08F/10/00 |
| WO | WO 93/25591 | 12/1993 | | C08F/210/16 |
| WO | WO 94/00500 | 1/1994 | | C08F/10/00 |
| WO | WO 94/11406 | 5/1994 | | C07F/17/00 |
| WO | WO 94/17112 | 8/1994 | | |
| WO | WO95/00526 | 1/1995 | | C07F/17/00 |
| WO | WO95/00683 | 1/1995 | | C25B/3/00 |
| WO | WO 95/16716 | 6/1995 | | C08F/210/16 |

* cited by examiner

METALLOCENE-CATALYZED PROCESS FOR THE MANUFACTURE OF EP AND EPDM POLYMERS

CROSS REFERENCE TO RELATED APPLICATIONS

This application is a continuation-in-part of application U.S. Ser. No. 08/208,068 filed Mar. 8, 1994, now abandoned, which is a continuation of application U.S. Ser. No. 07/815,716 filed Dec. 30, 1991 (now abandoned). This application is also a continuation-in-part of U.S. Ser. No. 08/592,756 filed Jan. 26, 1996 abandoned.

BACKGROUND OF THE INVENTION

This invention relates to elastomers. In one aspect, this invention relates to ethylene-propylene (EP) and ethylene-propylene-diene monomer (EPDM) elastomers while in another aspect, this invention relates to a process for their manufacture. In yet another aspect, this invention relates to elastomers made by a process in which the catalyst is a metallocene complex, more particularly to a class of Group 4 metal complexes.

Metallocene complexes and methods for their preparation are disclosed in U.S. Ser. No. 82,197 filed Jun. 24, 1993 (abandoned); U.S. Ser. No. 230,051 filed Apr. 19, 1994 (abandoned); U.S. Ser. No. 241,523 filed May 12, 1994 (now U.S. Pat. No. 5,470,993); U.S. Ser. No. 469,186 filed Jun. 6, 1995 (now U.S. Pat No. 5,624,878); U.S. Ser. No. 470,858 filed Aug. 15, 1995 (now U.S. Pat. No. 5,556,928) U.S. Ser. No. 545,403 filed Jul. 3, 1990 (pending, and of which EP-A-416,815 is an equivalent); U.S. Ser. No. 547, 718 filed Jul. 3, 1990 (abandoned in favor of continuation U.S. Ser. No. 896,732 which is now U.S. Pat. No. 5,321,106, and of which EP-A-468,651 is an equivalent); U.S. Ser. No. 702,475 filed May 20, 1991 (abandoned in favor of continuation-in-part U.S. Ser. No. 967,365 which is pending, and of which EP-A-514,828 is an equivalent); U.S. Ser. No. 876,268 filed May 5, 1992 (now U.S. Pat. No. 5,721,185, and of which EP-A-520,732 is an equivalent) and U.S. Ser. No. 8,003 file Jan. 21, 1993 (now U.S. Pat. No. 5,374,696, and of which WO93/19104 is an equivalent), as well as U.S. Pat. Nos. 5,055,438, 5,057,475, 5,096,867, 5,064,802 and 5,132,380. The teachings of all of the foregoing United States patents are incorporated herein by reference.

The term "elastomer" was first defined in 1940 to mean synthetic thermosetting high polymers having properties similar to those of vulcanized natural rubber, e.g. having the ability to be stretched to at least twice their original length and to retract very rapidly to approximately their original length when released. Representative of these "high polymers" were styrene-butadiene copolymer, polychloroprene, nitrile rubber, butyl rubber and ethylene-propylene terpolymers (aka EPDM rubbers). The term "elastomer" was later extended to include uncrosslinked thermoplastic polyolefins, i.e. TPO's.

ASTM D 1566 defines various physical properties, and the test methods for measuring these properties, of rubbers. U.S. Pat. No. 5,001,205 (Hoel) provides an overview of the known elastomers comprising ethylene copolymerized with an α-olefin. As Hoel describes, commercially viable elastomers have various minimum properties, e.g. a Mooney viscosity no less than 10, a weight average molecular weight (Mw) no less than 10,000, a glass transition temperature below –40 C., and a degree of crystallinity no greater than 25%. U.S. Pat. No. 5,001,205 discloses a process for polymerizing high molecular weight elastomers using liquid phase polmerization in the presence of a metallocene/alumoxane (i.e., bis(cyclopentadienyl)alumoxane) catalyst.

SUMMARY OF THE INVENTION

We have now discovered a process for the manufacture of ethylene-propylene and ethylene/α-olefin/diene monomer polymers. In one embodiment, the process comprises the steps of:

A. contacting in a first reactor (1) ethylene, (2) at least one $C_3$–$C_{20}$ aliphatic α-olefin, (3) optionally, at least one $C_4$–$C_{20}$ diene, (4) a catalyst, the catalyst comprising (a) a metallocene complex, and (b) at least one activator, and (5) a solvent, the first reactor operated such that a first product is produced at a solids concentration of from about 1 to about 15 weight percent, based on the weight of the reaction mass in the first reactor;

B. contacting in a second reactor (1) ethylene, (2) at least one $C_3$–$C_{20}$ aliphatic α-olefin, (3) optionally, at least one $C_4$–$C_{20}$ diene, (4) a catalyst, the catalyst comprising (a) a metallocene complex, and (b) at least one activator, (5) a solvent, and (6) a product stream from the first reactor, the second reactor operated such that a second product is produced at a solids concentration of from about 2 to about 30 weight percent, based on the weight of the reaction mass in the second reactor;

C. removing a product stream from the second reactor;

D. removing solvent from the product stream of the second reactor in an anhydrous, first stage solvent recovery operation such that the solids concentration of the product stream is increased by at least about 100 percent; and E. removing additional solvent in an anhydrous, second stage solvent recovery operation from the product of the the first stage solvent recovery operation such that the solids concentration of the product stream is in excess of 65 weight percent.

In another embodiment of this invention, the process comprises additional anhydrous solvent recovery operations in which the solids concentration of the final product is increased to greater than 99 weight percent. Preferably, the product of the first reactor has a weight average molecular weight greater than that of the product of the second reactor.

In yet another embodiment, the process comprises the steps of:

A. contacting in a first reactor (1) ethylene, (2) at least one $C_3$–$C_{20}$ aliphatic α-olefin, (3) optionally, at least one $C_4$–$C_{20}$ diene, (4) a catalyst, the catalyst comprising (a) a metallocene complex, and (b) at least one activator, and (5) a solvent, the first reactor operated such that a first product is produced at a solids concentration of from about 1 to about 30 weight percent, based on the weight of the reaction mass in the first reactor;

B. contacting in a second reactor (1) ethylene, (2) at least one $C_3$–$C_{20}$ aliphatic α-olefin, (3) optionally, at least one $C_4$–$C_{20}$ diene, (4) a catalyst, the catalyst comprising (a) a metallocene complex, (b) at least one activator, and (5) a solvent, the second reactor operated such that a second product is produced at a solids concentration of from about 1 to about 30 weight percent, based on the weight of the reaction mass in the second reactor;

C. recovering a product stream from each of the first and second reactors, and then blending these individual product streams into a combined product stream;

D. removing solvent from the combined product stream in an anhydrous, first stage solvent recovery operation such that the solids concentration of the combined product stream is increased by at least about 100 percent; and E. removing additional solvent in an anhydrous, second stage solvent recovery operation from the combined product stream such that the solids concentration of the combined product stream is in excess of 65 weight percent.

In another embodiment of this invention, the process comprises additional anhydrous solvent recovery operations in which the solids concentration of the final product is increased to greater than 99 weight percent. Preferably, the product of one reactor has a weight average molecular weight greater than that of the product of the other reactor.

DETAILED DESCRIPTION OF THE INVENTION

Figure 1:
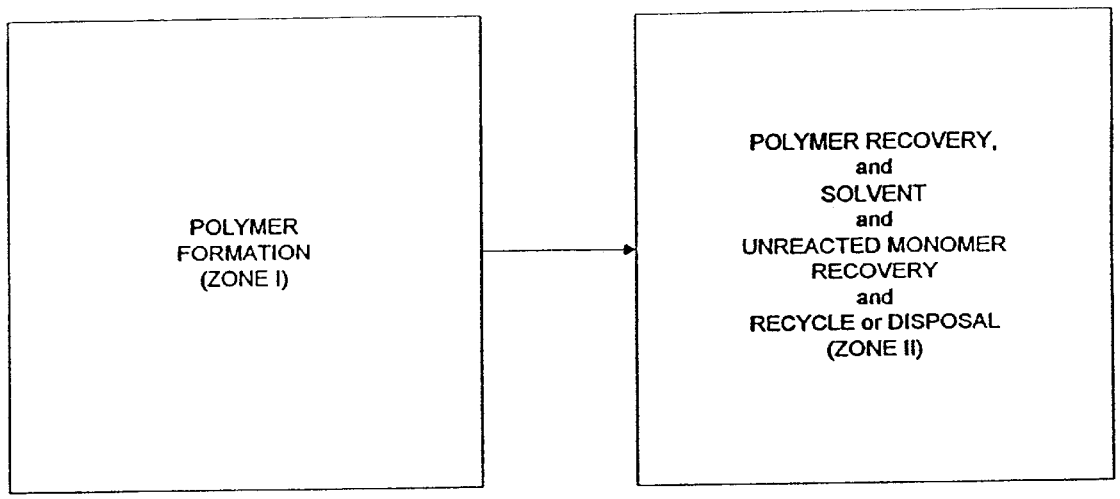
FIG. 1 is a diagramatic representation of the two principal zones of the polymerization process of this invention.

The elastomers made according to the new process disclosed herein are interpolymers of ethylene ($CH_2=CH_2$) with at least one comonomer selected from the group consisting of aliphatic $C_3-C_{20}$ alpha-olefins, conjugated dienes, and nonconjugated dienes. The term interpolymer includes copolymers, e.g. EP, and terpolymers, e.g. EPDM, but is not intended to limit the elastomers made to only one or two monomers copolymerized with ethylert. Examples of the aliphatic $C_3-C_{20}$ α-olefins include propene, 1-butene, 4-methyl-1-pentene, 1-hexene, 1-octene, 1-decene, 1-dodecene, 1-tetradecene, 1-hexadecene, 1-octadecene and 1-eicosene. The α-olefin can also contain a cyclic structure such as cyclohexane or cyclopentane, resulting in an α-olefin such as 3-cyclohexyl-1-propene (allyl-cyclohexane) and vinyl-cyclohexane. Although not α-olefins ii the classical sense of the term, certain cyclical olefins such as norbornene and related olefins can be used in place of some or all of the α-olefins.

Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene a preferred nonconjugated diene.

Examples of conjugated dienes include butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1,3, 4-methylpentadiene-1,3, 1,3-pentadiene ($CH_3CH=CH-CH=CH_2$; commonly called piperylene), 3-methyl-1,3-pentadiene, 2,4dimethyl-1,3-pentadiene, 3-ethyl-1,3-pentadiene, and the like; with 1,3-pentadiene a preferred conjugated diene.

Copolymers of ethylene and one aliphatic $C_3-C_{20}$ α-olefin or one diene (either conjugated or nonconjugated) can be prepared using the process of this invention. Interpolymers of ethylene, at least one aliphatic $C_3-C_{20}$ α-olefin, and/or at least one diene (either conjugated or nonconjugated) can also be made by using this process. Exemplary copolymers include ethylene/propylene and ethylene/1-octene. Exemplary terpolymers include ethylene/propylene/1-octene, ethylene/propylene/5-ethylidene-2-norbornene, ethylene/1-octene/5thylidene-2-norbornene, ethylene/propylene/1,3-pentadiene, and ethylene/1-octene/1,3-pentadiene. Exemplary tetrapolymers include ethylene/propylene/1-octene/diene (e.g. ENB) and ethylene/propylene/mixed dienes, e.g. ethylene/propylene/5-ethylidene-2-norbornene/piperylene. In addition, the elastomers made using the process of this invention can include minor amounts, e.g. 0.05–0.5 percent by weight, of long chain branch enhancers, such as 2,5-norbornadiene (aka bicyclo[2,2,1]hepta-2,5diene), diallylbenzene, 1,7-octadiene ($H_2C=CH(CH_2)_4CH=CH_2$), and 1,9-decadiene ($H_2C=CH(CH_2)_6CH=CH_2$).

At a general minimum, the elastomers made by the process of this invention comprise at least about 30, preferably at least about 40 and more preferably at least about 50, weight percent ethylene; at least about 15, preferably at least about 20 and more preferably at least about 25, weight percent of at least one α-olefin; and 0, preferably at least about 0.1 and more preferably at least about 0.5, weight percent of at least one conjugated or nonconjugated diene. At a general maximum, the elastomers made by the process of this invention comprise not more than about 85, preferably not more than about 80 and more preferably not more than about 75, weight percent ethylene; not more than about 70, preferably not more than about 60 and more preferably not more than about 55, weight percent of at least one α-olefin; and not more than about 20, preferably not more than about 15 and more preferably not more than about 12, weight percent of at least one of a conjugated or nonconjugated diene. All weight percentages are based on weight of the elastomer which can be determined using any conventional method.

The polydispersity (molecular weight distribution or $M_w/M_n$) of the interpolymer elastomers generally ranges from about 1.5, preferably about 1.8, and especially about 2.0 to about 15, preferably about 10, and especially about 6.

Measurement of the polydispersity index is done according to the following technique: The polymers are analyzed by gel permeation chromatography (GPC) on a Waters 150 C. high temperature chromatographic unit equipped with three linear mixed bed columns (Polymer Laboratories (10 micron particle size)), operating at a system temperature of 140° C. The solvent is 1,2,4-trichlorobenzene, from which about 0.5% by weight solutions of the samples are prepared for injection. The flow rate is 1.0 milliliter/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, (621) 1968, incorporated herein by reference) to derive the equation:

$$M_{polyethylene} = (a)(M_{polystyrene})^b$$

In this equation, a=0.4316 and b=1.0. Weight average molecular weight, $M_w$, is calculated in the usual manner according to the formula:

$$M_w = \Sigma(w_i)(M_i)$$

where $w_i$ and $M_i$ are the weight fraction and molecular weight respectively of the $i^{th}$ fraction eluting from the GPC column. Generally the $M_w$ of the interpolymer elastomers ranges from about 10,000, preferably about 20,000, more preferably about 40,000, and especially about 60,000 to about 1,000,000, preferably about 800,000, more preferably about 600,000, and especially about 500,000.

The elastomers made by the process of this invention cover a range of viscosities, depending upon the molecular weight of the elastomer and optional post polymerization Theological modification. In general, the viscosity of elastomers is characterized by Mooney viscosity which is measured according to ASTM D 1646-89, incorporated herein by reference, using a shear rheometer at 125° C. The Mooney viscosity for the elastomers generally ranges from a minimum of about 1, preferably about 5, more preferably about 10, and especially about 15 to a maximum of about 150, preferably about 125, more preferably about 100, and especially about 80.

The density of the elastomers is measured according to ASTM D-792, and these densities range from a minimum of about 0.850 grams/cubic centimeter (g/cm³), preferably about 0.853 g/cm³, and especially about 0.855 g/cm³, to a maximum of about 0.895 g/cm³, preferably about 0.885 g/cm³, and especially about 0.875 g/cm³.

The catalysts used in the process of this invention are metallocene complexes, and these catalysts and methods for their preparation are disclosed in U.S. Ser. No. 545,403 filed Jul. 3, 1990 (pending, and of which EP-A-416,815 is an equivalent); U.S. Ser. No. 702,475 filed May 20, 1991 (abandoned in favor of pending continuation-in-part U.S. Ser. No. 967,365, and which is an equivalent of EP-A-514, 828); as well as U.S. Pat. Nos. 5,470,993, 5,374,696, 5,231, 106, 5,055,438, 5,057,475, 5,096,867, 5,064,802, 5,132,380, 5,321,106, 5,470,993, 5,486,632, and elsewhere.

In U.S. Ser. No. 720,041 filed Jun. 24, 1991 (abandoned in favor of continuation-in-part U.S. Ser. No. 876,268 now U.S. Pat. No. 5,721,185, and of which EP-A-514,828 is an equivalent) certain borane derivatives of the foregoing metallocene complex catalysts are disclosed and a method for their preparation taught and claimed. In U.S. Pat. No. 5,453,410 combinations of cationic metallocene complex catalysts with an alumoxane were disclosed as suitable olefin polymerization catalysts.

The aforementioned U.S. patents and allowed patent applications are incorporated herein by reference.

Preferred for use herein are catalyst compositions comprising:

a1) a metal complex corresponding to the formula: $ZLMX_pX'_q$, that has been or subsequently is rendered catalytically active by combination with an activating cocatalyst or by use of an activating technique, wherein M is a metal of Group 4 of the Periodic table of the Elements having an oxidation state of +2, +3 or +4, bound in an $\eta^5$ bonding mode to L;

L is a cyclopentadienyl-, indenyl-, tetrahydroindenyl-, fluorenyl-, tetrahydrofluorenyl-, or octahydrofluorenyl- group covalently substituted with at least a divalent moiety, Z, and L further may be substitiued with from 1 to 8 substituents independently selected from the group consisting of hydrocarbyl, halo, halohydrocarbyl, hydrocarbyloxy, dihydrocarbylamine, dihydrocarbylphosphino or silyl groups containing up to 20 nonhydrogen atoms;

Z is a divalent moiety bound to both L and M via σ-bonds, said Z comprising boron, or a member of Group 14 of the Periodic Table of the Elements, and optionally, also comprising nitrogen, phosphorus, sulfur or oxygen;

X is an anionic or dianionic ligand group having up to 60 atoms exclusive of the class of ligands that are cyclic, delocalized, π-bound ligand groups;

X' independently each occurrence is a neutral Lewis base ligating compounding, having up to 20 atoms;

p is 0, 1 or 2, and is two less than the formal oxidation state of M, with the proviso that when X is a dianionic ligand group, p is 1; and q is 0, 1 or 2;

said metal complex being rendered catalytically active by combination with an activating cocatalyst or use of an activating technique; or a catalyst composition comprising a cationic complex a2) corresponding to the formula $(ZLM^*X^*_{p^*})^*A^-$, wherein: M* is a metal of Group 4 of the Periodic Table of the Elements having an oxidation state of +3 or +4, bound in an $\theta^5$ bonding mode to L;

L is a cyclopentadienyl-, indenyl-, tetrahydroindenyl-, fluorenyl-, tetrahydrofluorenyl-, or octahydrofluorenyl- group covalently substituted with at least a divalent moiety, Z, and L further may be substituted with from 1 to 8 substituents independently selected from the group consisting of hydrocarbyl, halo, halohydrocarbyl, hydrocarbyloxy, dihydrocarbylamino, dihydrocarbylphosphino or silyl groups containing up to 20 nonhydrogen atoms;

Z is a divalent moiety bound to both L and M* via σ-bonds, said Z comprising boron, or a member of Group 14 of the Periodic table of the Elements, and also optionally comprising nitrogen, phosphorus, sulfur or oxygen;

X* is an anionic ligand group having up to 60 atoms exclusive of the class of ligands that are cyclic, delocalized, π-bound ligand groups;

p* is 0 or 1, and is three less than the formal oxidation state of M; and

A⁻ is an inert, noncoordinating anion.

All references to the Periodic Table of the Elements herein shall refer to the Periodic Table of the Elements, published and copyrighted by CRC Press, Inc., 1989. Also, any references to a Group or Groups shall be to the Group or Groups as reflected in this Periodic Table of the Elements using the IUPAC system for numbering groups.

Zwitterionic complexes result from activation of a Group 4 metal diene complex, that is, complexes in the form of a metallocyclopentene wherein the metal is in the +4 formal oxidation state, by the use of a Lewis acid activating cocatalyst, especially tris(perfluoroaryl)borane compounds. These zwitterionic complexes are believed to correspond to the formula:

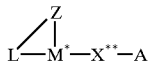

wherein:
M is a Group 4 metal in the +4 formal oxidation state;
L and Z are as previously defined;
X** is the divalent remnant of the conjugated diene, X', formed by ring opening at one of the carbon to metal bonds of a metallocyclopentene; and
A⁻ is the moiety derived from the activating cocatalyst.

As used herein, the recitation "noncoordinating, compatible anion" means an anion which either does not coordinate to component a1) or which is only weakly coordinated therewith remaining sufficiently labile to be displayed by a neutral Lewis base. A noncoordinating, compatible anion specifically refers to a compatible anion which when functioning as a charge balancing anion in the catalyst system of this invention, does not transfer an anionic substituent or fragment thereof to said cation thereby forming a neutral four coordinate metallocene and a neutral metal byproduct. "Compatible anions" are anions which are not degraded to neutrality when the initially formed complex decomposes and are noninterfering with desired subsequent polymerizations.

Preferred X' goups are phosphines, especially trimethylphosphine, triethylphosphine, triphenylphosphine and bis(1,2-dimethylphosphino)ethane; $P(OR)_3$, wherein R is as previously defined; ethers, especially tetrahydrofuran; amines, especially pyridine, bipyridine, tetramethylethylenediamine (TMEDA), and triethylamine; olefins, and conjugated dienes having from 4 to 40 carbon atoms. Complexes including the latter X' groups include those wherein the metal is in the +2 formal oxidation state.

Preferred metal complexes a1) used according to the present invention are complexes corresponding to the formula:

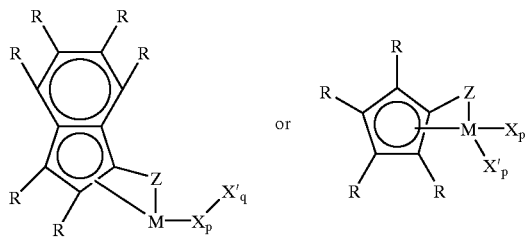

wherein:
R independently each occurrence is a group selected from hydrogen, hydrocarbyl, halohydrocarbyl, silyl, germyl and mixtures thereof, said group containing up to 20 nonhydrogen atoms;
M is titanium, zirconium or hafnium;
Z is a divalent moiety comprising boron, or a member of Group 14 of the Periodic Table of the Elements, and also comprising nitrogen, phosphorus, sulfur or oxygen, said moiety having up to 60 nonhydrogen atoms;

X and X' are as previously defined;
p is 0, 1 or 2; and
q is 0 or 1;
with the proviso that;
when p is 2, q is 0, M is in the +4 formal oxidation state, and X is an anionic ligand selected from the group consisting of halide, hydrocarbyl, hydrocarbyloxy, di(hydrocarbyl)amido, di(hydrocarbyl)phosphido, hydrocarbylsulfido, and silyl goups, as well as halo-, di(hydrocarbyl)amino-, hydrocarbyloxy- and di(hydrocarbyl)phoshino-substituted derivatives thereof, said X group having up to 20 nonhydrogen atoms,
when p is 1, q is 0, M is in the +3 formal oxidation state, and X is a stabilizing anionic ligand group selected from the group consisting of allyl, 2-(N,N-dimethylaminomethyl)phenyl, and 2-(N,N-dimethyl) aminobenzyl, or M is in the +4 formal oxidation state, and X is a divalent derivative of a conjugated diene, M and X together forming a metallocyclopentene group, and
when p is 0, q is 1, M is in the +2 formal oxidation state, and X' is a neutral, conjugated or nonconjugated diene, optionally substituted with one or more hydroearbyl groups, said X' having up to 40 carbon atoms and forming a π-complex with M.

More preferred coordination complexes a1) used according to the present invention are complexes corresponding to the formula:

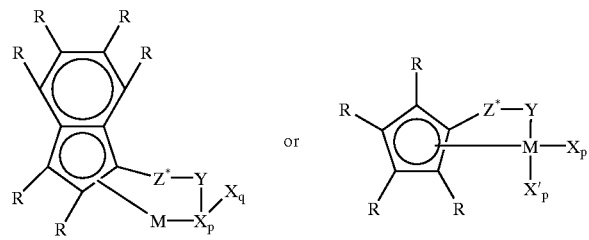

wherein:
R independently each occurrence is hydrogen or $C_{1-6}$ alkyl;
M is titanium;
Y is —O—, —S—, —NR*—, —PR*—;
Z* is $SiR*_2$, $CR*_2$, $SiR*_2SiR*_2$, $CR*_2CR*_2$, $CR*=CR*$, $CR*_2SiR*_2$, or $GeR*_2$;
R* each occurrence is independently hydrogen, or a member selected from hydrocarbyl, hydrocarbyloxy, silyl, halogenated alkyl, halogenated aryl, and combinations thereof, and R* having up to 20 nonhydrogen atoms, and optionally, two R* groups from Z (when R* is not hydrogen), or an R* group from Z and an R* group from Y form a ring system;.
p is 0, 1 or 2;
q is 0 or 1;
with the proviso that:
when p is 2, q is 0, M is in the +4 formal oxidation state, and X is independently each occurrence methyl or benzyl,
when p is 1, q is 0, M is in the +3 formal oxidation state, and X is 2-(N,N-dimethyl)aminobenzyl); or M is in the +4 formal oxidation state and X is 1,4-butadienyl, and
when p is 0, q is 1, M is in the +2 formal oxidation state, and X' is 1,4-dipenyl-1,3-butadiene or 1,3-pentadiene.

The latter diene is illustrative of unsymmetrical diene groups that result in production of metal complexes that are actually mixtures of the respective geometrical isomers.

The complexes can be prepared by use of well known synthetic techniques. A preferred process for preparing the metal complexes is disclosed in U.S. Ser. No. 08/427,378, filed Apr. 24, 1995, (now U.S. Pat. No. 5,491,246) the teachings of which are hereby incorporated by reference. The reactions are conducted in a suitable noninterfering solvent at a temperature from −100 to 300° C., preferably from −78 to 100° C., most preferably from 0 to 50° C. A reducing agent may be used to cause the metal M to be reduced from a higher to a lower oxidation state. Examples of suitable reducing agents are alkali metals, alkaline earth metals, aluminum and zinc, alloys of alkali metals or alkaline earch metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts useful in combination with component a1) are those compounds capable of abstraction of an X substituent from a1) to form an inert, noninterfering counter ion, or that form a zwitterionic derivative of a1). Suitable activating cocatalysts for use herein include perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, and ferritenium salts of compatible, noncoordinating anions. Suitable activating techniques include the use of bulk electrolysis (explained in more detail hereinafter). A combination of the foregoing activating cocatalysts and techniques may be employed as well. The foregoing activating cocatalysts and activating techniques have been previously taught with respect to different metal complexes in the following references: EP-A-277,003, U.S. Pat. Nos. 5,153,157, 5,064,802, EP-A468,651 (equivalent to U.S. Ser. No. 07/547,718 abandoned in favor of U.S. Ser. No. 896,732, which is now U.S. Pat. No. 5,321,106), EP-A-520,732 (equivalent to U.S. Ser. No. 07/876,268 now U.S. Pat. No. 5,721,185), and EP-A-520,732 (equivalent to U.S. Ser. No. 07/884,966 (now U.S. Pat. No. 5,350,723) filed May 1, 1992), the teachings of which are hereby incorporated by reference.

More particularly, suitable ion forming compounds useful as cocatalysts in one embodiment of the present invention comprise a cation which is a Bronsted acid capable of donating a proton, and a compatible, noncoordinating anion, $A^-$.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitrites. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

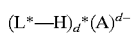

wherein:
  L* is a neutral Lewis base;
  (L*—H)⁺ is a Bronsted acid;
  $A^{d-}$ is a noncoordinating, compatible anion having a charge of d−, and
  d is an integer from 1–3.

More preferably $A^{d-}$ corresponds to the formula: $[M'Q_4]^-$;
wherein:
  M' is boron or aluminum in the formal +3 formal oxidation state; and
  Q independently each occurrence is selected from hydride, dialkylamido, halide, hydrocarbyl, hydrocarbyloxide, halosubstituted-hydrocarbyl, halosubstituted hydrocarbyloxy, and halosubstituted silylhydrocarbyl radicals (including perhalogenated hydrocarbylperhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the teachings of which are herein incorporated by reference.

In a more preferred embodiment, d is 1, that is, the counter ion has a single negative charge and is $A^-$. Activating cocatalysts comprising boron which are particularly useful in the preparation of catalysts of this invention may be represented by the following general formula:

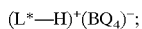

wherein:
  L* is as previously defined;
  B is boron in a formal oxidation state of 3; and
  Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are trisubstituted ammonium salts such as:

trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsiiyl)-2,3,5 6-tetrafluorophenyl)borate,
N,N-dimethylanilinium tetrakis(4-(triisopropysilyl)-2,3,5,6-tetrafluorophenyl)borate,
N,N-dimethylanilinium pentafluorophenoxytris(pentafluorphenyl)borate,
N,N-diethylanilinium tetrakis(pentafluorphenyl)borate,
N,N-dimethyl-2,4,6-trimethylanilinium tetrakis(pentafluorophenyl)borate,
trimethylammonium tetrakis (2,3,4,6-tetrafluorophenyl)borate,
triethylammonium tetrakis (2,3,4,6-tetrafluorophenyl)borate,
tripropylammonium tetrakis (2,3,4,6-tetrafluorophcnyl)borate,
tri(n-butyl)ammonium tetrakis (2,3,4,6-tetrafluorophenyl)borate,
dimethyl(t-butyl)ammonium tetrakis (2,3,4,6-tetrafluorophenyl)borate,
N,N-dimethylanilinium tetrakis (2,3,4,6-tetrafluorophenyl)borate,
N,N-diethylanilinium tetrakis (2,3,4,6-tetrafluorophenyl)borate, and
N,N-dimethyl-2,4,6-trimethylanilinium tetrakis (2,3,4,6-tetrafluorophenyl)borate;
disubstituted ammonium salts such as:

di-(i-propyl)ammonium tetrakis(pentafluorophenyl)borate, and
dicyclohexylammonium tetrakis(pentafluorophenyl)borate;

trisubstituted phosphonium salts such as:

triphenylphosphonium tetrakis(pentafluorophenyl)borate,
tri(o-tolyl)phosphonium tetrakis(pentafluorophenyl)borate, and
tri(2,6-dimethylphenyl)phosphonium tetrais(pentafluorophenyl)borate;

disubstituted oxonium salts such as:
diphenyloxonium tetrakis(pentafluorophenyl)borate,
di(o-tolyl)oxonium tetrakis(pentafluororphenyl)borate, and
di(2,6-dimethylphenyl oxonium tetrakis (pentafluorophenyl)borate;
disubstituted sulfonium salts such as:

diphenylsulfonium tetrakis(pentafluorophenyl)borate,
di(o-tolyl)sulfonium tetrakis(pentafluorophenyl)borate, and
bis(2,6-dimethylphenyl)sulfonium tetrakis(pentafluorophenyl)borate.

Preferred $(L^*—H)^+$ cations are N,N-dimethylanilinium and tributylammonium.

Another suitable ion forming, activating cocatalyst comprises a salt of a cationic oxidizing agent and a noncoordinating, compatible anion represented by the formula:

wherein:
$Ox^{e+}$ is a cationic oxidizing agent having a charge of e+;
e is an integer from 1 to 3; and
$A^{d-}$ and d are as previously defined.

Examples of cationic oxidizing agents include: ferrocenium, hydrocarbyl-substituted ferrocenium, $Ag^+$ or $Pb^{+2}$. Preferred embodiments of $A^{d-}$ are those anions previously defined with respect to the Bronsted acid containing activating cocatalysts, especially tetrakis(pentafuorophenyl)borate.

Another suitable ion forming, activating cocatalyst comprises a compound which is a salt of a carbenium ion and a noncoordinating, compatible anion represented by the formula:

wherein:
$©^+$ is a $C_{1-20}$ carbenium ion; and
$A^-$ is as previously defined. A preferred carbenium ion is the trityl cation, i.e. triphenylmethylium.

A further suitable ion forming, activating cocatalyst comprises a compound which is a salt of a silylium ion and a noncoordinating, compatible anion represented by the formula:

$$R'''_3Si^*A^-$$

wherein:
$R'''$ is $C_{1-10}$ hydrocarbyl, and $A^-$ is as previously defined.
Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. Ser. No. 08/304,314 (now U.S. Pat. No. 5,625,087), filed Sep. 12, 1994.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are (i) liquids under the conditions of the electrolysis (generally temperatures from 0 to 100° C.), (ii) capable of dissolving the supporting electrolyte, and (iii) inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), dimethoxyethane (DME), and mixtures thereof.

The electrolysis may be conducted in a standard electrolytic cell containing an anode and cathode (also referred to as the working electrode and counterelectrode respectively). Suitable materials of construction for the cell are glass, plastic, ceramic and glass-coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass frit separates the cell into separate compartments, the working electrode compartment and counterelectrode compartment. The working electrode is immersed in a reaction medium comprising the metal complex to be activated, solvent, supporting electrolyte, and any other materials desired for moderating the electrolysis or stabilizing the resulting complex. The counterelectrode is immersed in a mixture of the solvent and supporting electrolyte. The desired voltage may be determined by theoretical calculations or experimentally by sweeping the cell using a reference electrode such as silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and a compatible, noncoordinating anion, $A^-$. Preferred supporting electrolytes are salts corresponding to the formula $G^+A^-$;
wherein:
  $G^+$ is a cation which is nonreactive towards the starting and resulting complex, and
  $A^-$ is as previously defined.

Examples of cations, $G^+$, include tetrahydrocarbyl substituted ammonium or phosphonium cations having up to 40 nonhydrogen atoms. Preferred cations are the tetra(n-butylammonium)- and tetraethylammonium-cations.

During activation of the complexes of the present invention by bulk electrolysis the cation of the supporting electrolyte passes to the counterelectrode and $A^-$ migrates to the working electrode to become the anion of the resulting oxidized product. Either the solvent or the cation of the supporting electrolyte is reduced at the counterelectrode in equal molar quantity with the amount of oxidized metal complex formed at the working electrode. Preferred supporting electrolytes are tetrahydrocarbylammonium salts of tetrakis(perfluoroaryl)borates having from 1 to 10 carbons in each hydrocarbyl or perfluoroaryl group, especially tetra(n-butylammonium)tetrakis-(pentafluorophenyl)borate.

A further recently discovered electrochemical technique for generation of activating cocatalysts is the electrolysis of a disilane compound in the presence of a source of a noncoordinating compatible anion. All of the foregoing techniques are more fully disclosed and claimed in U.S. Ser. No. 08/82,201 (now U.S. Pat. No. 5,372,682), filed on Sep. 12, 1994 and published in equivalent form as (WO95/00683). In as much as the activation technique ultimately produces a cationic metal complex, the amount of such resulting complex formed during the process can be readily determined by measuring the quantity of energy used to form the activated complex in the process.

Alumoxanes, especially methylalumoxane or triisobutylaluminum modified methylalumoxane are also suitable activators and may be used for activating the present metal complexes.

A most preferred activating cocatalyst is trispentafluorophenylborane.

The molar ratio of metal complex: activating cocatalyst employed preferably ranges from 1:1000 to 2:1, more preferably from 1:5 to 1.5:1, most preferably from 1:2 to 1:1.

Highly preferred metal complexes are:
tetramethylcyclopentadienyl complexes:

(n-butylamido)dimethyl($\eta^5$-tetramethylcyclopentadienyl) silanetitanium (II) 1,4-diphenyl-1,3-butadiene,
(n-butylamido)dimethyl($\eta^5$-tetramethylcyclopentadienyl) silanetitanium (II) 1,3-pentadiene,
(n-butylamido)dimethyl($\eta^5$-tetramethylcyclopentadienyl) silanetitanium (III) 2-(N,N-dimethylamino)benzyl,
(n-butylamido)dimethyl($\eta^5$-tetramethylcyclopentadienyl) silanetitanium (IV) dimethyl,
(n-butylamido)dimethyl($\eta^5$-tetramethylcyclopentadienyl) silanetitanium (IV) dibenzyl,
(t-butylamido)dimethyl($\eta^5$-tetramethylcyclopentadienyl) silanetitanium (IV) 1,4-diphenyl-1,3-butadiene,
(t-butylamido)dimethyl($\eta^5$-tetramethylcyclopentadienyl) silanetitanium (II) 1,3-pentadiene,
(t-butylamido)dimethyl($\eta^5$-tetramethylcyclopentadienyl) silanetitanium (III) 2-(N,N-dimethylamino)benzyl,
(t-butylamido)dimethyl($\eta^5$-tetramethylcyclopentadienyl) silanetitanium (IV) dimethyl,
(t-butylamido)dimethyl($\eta^5$-tetramethylcyclopentadienyl) silanetitanium (IV) dibenzyl,
(cyclododecylamido)dimethyl($\eta^5$-tetramethylcyclopentadienyl)silanetitanium (II) 1,4-diphenyl-1,3-butadiene,
(cyclododecylamido)dimethyl($\eta^5$-tetramethylcyclopentadienyl)silanetitanium (II) 1,3-pentadiene,
(cyclododecylamido)dimethyl($\eta^5$-tetramethylcyclopentadienyl)silanetitanium (III) 2-(N,N-dimethylamino)benzyl,
(cyclododecylamido)dimethyl($\eta^5$-tetramethylcyclopentadienyl)silanetitanium (IV) dimethyl,
(cyclododecylamido)dimethyl($\eta^5$-tetramethylcyclopentadienyl)silanetitanium (IV) dibenzyl,
(2,4,6-trimethylanilido)dimethyl($\eta^5$-tetramethylcyclopentadienyl)silanetitanium (II) 1,4-diphenyl-1,3-butadiene,
(2,4,6-trimethylanilido)dimethyl($\eta^5$-tetramethylcyclopentadienyl)silanetitanium (II) 1,3-pentadiene,
(2,4,6-trimethylanilido)dimethyl($\eta^5$-tetramethylcyclopentadienyl)silanetitanium (III) 2-(N,N-dimethylamino)benzyl,
(2,4,6-trimethylanilido)dimethyl($\eta^5$-tetramethylcyclopentadienyl)silanetitanium (IV) dimethyl,
(2,4,6-trimethylanilido)dimethyl($\eta^5$-tetramethylcyclopentadienyl)silanetitanium (IV) dibenzyl,
(1-adamantylamido)dimethyl($\eta^5$-tetramethylcyclopentadienyl)silanetitanium (II) 1,4-diphenyl-1,3-butadiene,
(1-adamantylamido)dimethyl($\eta^5$-tetramethylcyclopentadienyl)silanetitanium (II) 1,3-pentadiene,
(1-adamantylamido)dimethyl($\eta^5$-tetramethylcyclopentadienyl)silanetitanium (III) 2-(N,N-dimethylamino)benzyl,
(1-adamantylamido)dimethyl($\eta^5$-tetramethylcyclopentadienyl)silanetitanium (IV) dimethyl,
(1-adamantylamido)dimethyl($\eta^5$-treamethylcyclopentadienyl)silanetitanium (IV) dibenzyl, (t-butylamido)dimethyl(η⁵-tetramethylcyclopentadienyl) silanetitanium (II) 1,4-diphenyl-1,3-butadiene,
(t-butylamido)dimethyl(η⁵-tetramethylcyclopentadienyl) silanetitanium (II) 1,3pentadiene,
(t-butylamido)dimethyl(η⁵-tetramethylcyclopentadienyl) silanetitanium (II) 2-(N,N-dimethylamino)benzyl,
(t-butylamido)dimethyl(η⁵-tetramethylcyclopentadienyl) silanetitanium (IV) dimethyl,
(t-butylamido)dimethyl(η⁵-tetramethylcyclopentadienyl) silanetitanium (IV) dibenzyl,
(n-butylamido)diisopropoxy(η⁵-tetramethylcyclopentadienyl)silanetitanium (II) 1,4-diphenyl-1,3-butadiene,
(n-butylamido)diisopropoxy(η⁵-tetramethylcyclopentadienyl)silanetitanium (II) 1,3-pentadiene,
(n-butylamido)diisopropoxy(η⁵-tetramethylcyclopentadienyl)silanetitanium (III) 2-(N,N-dimethylamino)benzyl,
(n-butylamido)diisopropoxy(η⁵-tetramethylcyclopentadienyl)silanetitanium (IV) dimethyl,
(n-butylamido)diisopropoxy(η⁵-tetramethylcyclopentadienyl)silanetitanium (IV) dibenzyl,
(cyclododecylamido)diisopropoxy(η⁵-tetramethylcyclopentadienyl)-silanetitanium (II) 1,4-diphenyl-1,3-butadiene,
(cyclododecylamido)diisopropoxy(η⁵-tetramethylcyclopentadienyl)-silanetitanium (II) 1,3-pentadiene,
(cyclododecylamido)diisopropoxy(η⁵-tetramethylcyclopentadienyl)-silanetitanium (III) 2-(N,N-dimethylamino)benzyl,
(cyclododecylamido)diisopropoxy(η⁵-tetramethylcyclopentadienyl)-silanetitanium (IV) dimethyl,
(cyclododecylamido)diisopropoxy(η⁵-tetramethylcyclopentadienyl)-silanetitanium (IV) dibenzyl,
(2,4,6-trimethylanilido)diisopropoxy(η⁵-2-methyl-indenyl) silanetitanium (II) 1,4-diphenyl-1,3-butadiene,
(2,4,6-trimethylanilido)diisopropoxy(η⁵-tetramethylcyclopentadienyl)silanetitanium (II) 1,3-pentadiene,
(2,4,6-trimethylanilido)diisopropoxy(η⁵-2-methylin-denyl) silanetitanium (III) 2-(N,N-dimethylamino)benzyl,
(2,4,6-trimethylanilido)diisopropoxy(η⁵-tetramethylcyclopentadienyl)silanetitanium (IV) dimethyl,
(2,4,6-trimethylanilido)diisopropoxy(η⁵-tetramethylcyclopentadienyl)silanetitanium (IV) dibenzyl,
(1-adamantylamido)diisopropoxy(η⁵-tetramethylcyclopentadienyl)silanetitanium (II) 1,4-diphenyl-1,3-butadiene,
(1-adamantylamido)diisopropoxy(η⁵-tetramethylcyclopentadienyl)silanetitanium (II) 1,3-pentadiene,
(1-adamantylamido)diisopropoxy(η⁵-tetramethylcyclopentadienyl)silanetitanium (III) 2-(N,N-dimethylamino)benzyl,
(1-adamantylamido)diisopropoxy(η⁵-tetramethylcyclopentadienyl)silanetitanium (IV) dimethyl,
(1-adamantylamido)diisopropoxy(η⁵-tetramethylcyclopentadienyl)silanetitanium (IV) dibenzyl,
(n-butylamido)dimethoxy(η⁵-tetramethylcyclopentadienyl) silanetitanium (II) 1,4-diphenyl-1,3-butadiene,
(n-butylamido)dimethoxy(η⁵-tetramethylcyclopentadienyl) silanetitanium (II) 1,3-pentadiene,
(n-butylamido)dimethoxy(η⁵-tetramethylcyclopentadienyl) silanetitanium (III) 2-(N,N-dimethylamino)benzyl,
(n-butylamido)dimethoxy(η⁵-tetramethylcyclopentadienyl) silanetitanium (IV) dimethyl,
(n-butylamido)dimethoxy(η⁵-tetramethylcyclopentadienyl) silanetitanium (IV) dibenzyl,
(cyclododecylamido)dimethoxy(η⁵-tetramethylcyclopentadienyl)silanetitanium (II) 1,4-diphenyl-1,3-butadiene,
(cyclododecylamido)dimethoxy(η⁵-tetramethylcyclopentadienyl)silanetitanium (II) 1,3-pentadiene,
(cyclododecylamido)dimethoxy(η⁵-tetramethylcyclopentadienyl)silanetitanium (III) 2-(N,N-dimethylamino)benzyl,
(cyclododecylamido)dimethoxy(η⁵-tetramethylcyclopentadienyl)silanetitanium (IV) dimethyl,
(cyclododecylamido)dimethoxy(η⁵-tetramethylcyclopentadienyl)silanetitanium (IV) dibenzyl,
(2,4,6-trimethylanilido)dimethoxy(η⁵-tetramethylcyclopentadienyl)silanetitanium (II) 1,4-diphenyl-1,3-butadiene,
(2,4,6-trimethylanilido)dimethoxy(η⁵-tetramethylcyclopentadienyl)silanetitanium (II) 1,3-pentadiene,
(2,4,6-trimethylanilido)dimethoxy(η⁵-tetramethylcyclopentadienyl)silanetitanium (III) 2-(N,N-dimethylamino)benzyl
(2,4,6-trimethylanilido)dimethoxy(η⁵-tetramethylcyclopentadienyl)silanetitanium (IV) dimethyl,
(2,4,6-trimethylanilido)dimethoxy(η⁵-tetramethylcyclopentadienyl)silanetitanium (IV) dibenzyl,
(1-adamantylamido)dimethoxy(η⁵-tetramethylcyclopentadienyl)silanetitanium (II) 1,4-diphenyl-1,3-butadiene,
(1-adamantylamido)dimethoxy(η⁵-tetramethylcyclopentadienyl)silanetitanium (II) 1,3-pentadiene,
(1-adamantylamido)dimethoxy(η⁵-tetramethylcyclopentadienyl)silanetitanium (III) 2-(N,N-dimethylamino)benzyl,
(1-adamantylamido)dimethoxy(η⁵-tetramethylcyclopentadienyl)silanetitanium (IV) dimethyl,
(1-adamantylamido)dimethoxy(η⁵-tetramethylcyclopentadienyl)silanetitanium (IV) dibenzyl,
(n-butylamido)ethoxymethyl(η⁵-tetramethylcyclopentadienyl)silanetitanium (II) 1,4-diphenyl-1,3-butadiene,
(n-butylamido)ethoxymethyl(η⁵-tetramethylcyclopentadienyl)silanetitanium (II) 1,3-pentadiene,
(n-butylamido)ethoxymethyl(η⁵-tetramethylcyclopentadienyl)silanetitanium (III) 2-(N,N-dimethylamino)benzyl,
(n-butylamido)ethoxymethyl(η⁵-tetramethylcyclopentadienyl)silanetitanium (IV) dimethyl, (n-butylamido)ethoxymethyl($\eta^5$-tetramethylcyclopentadienyl)silanetitanium (IV) dibenzyl,
(cyclododecylamido)ethoxymethyl($\eta^5$-tetramethylcyclopentadienyl)silanetitanium (II) 1,4-diphenyl-1,3-butadiene,
(cyclododecylamido)ethoxymethyl($\eta^5$-tetramethylcyclopentadienyl)silanetitanium (II) 1,3-pentadiene,
(cyclododecylamido)ethoxymethyl($\eta^5$-tetramethylcyclopentadienyl)silanetitanium (III) 2-(N,N-dimethylamino)benzyl,
(cyclododecylamido)ethoxymethyl($\eta^5$-tetramethylcyclopentadienyl)silanetitanium (IV) dimethyl,
(cyclododecylamido)ethoxymethyl($\eta^5$-tetramethylcyclopentadienyl)silanetitanium (IV) dibenzyl,
(2,4,6-trimethylanilido)ethoxymethyl($\eta^5$-tetramethylcyclopentadienyl)silanetitanium (II) 1,4-diphenyl-1,3-butadiene,
(2,4,6-trimethylanilido)ethoxymethyl($\eta^5$-tetramethylcyclopentadienyl)silanetitanium (II) 1,3-pentadiene,
(2,4,6-trimethylanilido)ethoxymethyl($\eta^5$-tetramethylcyclopentadienyl)silanetitanium (III) 2-(N,N-dimethylamino)benzyl,
(2,4,6-trimethylanilido)ethoxymethyl($\eta^5$-tetramethylcyclopentadienyl)silanetitanium (IV) dimethyl,
(2,4,6-trimethylanilido)ethoxymethyl($\eta^5$-tetramethylcyclopentadienyl)silanetitanium (IV) dibenzyl,
(1-adamantylamido)ethoxymethyl($\eta^5$-tetramethylcyclopentadienyl)silanetitanium (II) 1,4-diphenyl-1,3-butadiene,
(1-adamantylamido)ethoxymethyl($\eta^5$-tetramethylcyclopentadienyl)silanetitanium (II) 1,3-pentadiene,
(1-adamantylamido)ethoxymethyl($\eta^5$-tetramethylcyclopentadienyl)silanetitanium (II) 2-(N,N-dimethylamino)benzyl,
(1-adamantylamido)ethoxymethyl($\eta^5$-tetramethylcyclopentadienyl)silanetitanium (IV) dimethyl,
(1-adamantylamido)ethoxymethyl($\eta^5$-tetramethylcyclopentadienyl)silanetitanium (IV) dibenzyl, 2-methylindenyl complexes;

(t-butylamido)dimethyl($\eta^5$-2-methylindenyl)silanetitanium (II) 1,4-diphenyl-1,3-butadiene,
(t-butylamido)dimethyl($\eta^5$-methylindenyl)silanetitaniumn (II) 1,3-pentadiene,
(t-butylamido)dimethyl($\eta^5$-2-methylindenyl)silanetitanium (III) 2-(N,N-dimethylamino)benzyl,
(t-butylamido)dimethyl($\eta^5$-2-methylindenyl)silanetitanium (IV) dimethyl,
(t-butylamido)dimethyl($\eta^5$-2-methylindenyl)silanetitanium (IV) dibenzyl,
(n-butylamido)dimethyl($\eta^5$-2-methylindenyl)silanetitanium (II) 1,4-diphenyl-1,3-butadiene,
(n-butylamido)dimethyl($\eta^5$-2-methylindenyl)silanetitanium (II) 1,3-pentadiene,
n-butylamido)dimethyl($\eta^5$-2-methylindenyl)silanetitanium (III) 2-(N,N-dimethylamino)benzyl,
n-butylamido)dimethyl($\eta^5$-2-metlylindenyl)silanetitanium (IV) dimethyl,
(n-butylamido)dimethyl($\eta^5$-2-methylindenyl)silanetitanium (IV) dibenzyl,
(cyclododecylamido)dimethyl($\eta^5$-2-methylindenyl)silanetitanium (II) 1,4-diphenyl-1,3-butadiene,
(cyclododecylamido)dimethyl($\eta^5$-2-methylindenyl)silanetitanium (II) 1,3-pentadiene,
(cyclododecylamido)dimethyl($\eta^5$-2-methylindenyl)silanetitanium (III) 2-(N,N-dimethylamino)benzyl,
(cyclododecylamido)dimethyl($\eta^5$-2-methylindenyl)silanetitanium (IV) dimethyl,
(cyclododecylamido)dimethyl($\eta^5$-2-methylindenyl)silanetitanium (IV) dibenzyl,
(2,4,6-trimethylanilido)dimethyl($\eta^5$-2-methylindenyl)silanetitanium (IV) 1,4-diphenyl-1,3-butadiene,
(2,4,6-trimethylanilido)dimethyl($\eta^5$-2-methylindenyl)silanetitanium (II) 1,3-pentadiene,
(2,4,6-trimethylanilido)dimethyl($\eta^5$-2-methylindenyl)silanetitanium (III) 2(N,N-dimethylamino)benzyl,
(2,4,6-trimethylanilido)dimethyl($\eta^5$-2-methylindenyl)silanetitanium (IV) dimethyl,
(2,4,6-trimethylanilido)dimethyl($\eta^5$-2-methylindenyl)silanetitanium (IV) dibenzyl,
(1-adamantylamido)dimethyl($\eta^5$-2-methylindenyl)silanetitanium (II) 1,4-diphenyl-1,3-butadiene,
(1-adamantylamido)dimethyl($\eta^5$-2-methylindenyl)silanetitanium (II) 1,3-pentadiene,
(1-adamantylamido)dimethyl($\eta^5$-2-methylindenyl)silanetitanium (III) 2-(N,N-dimethylamino)benzyl,
(1-adamantylamido)dimethyl($\eta^5$-2-methylindenyl)silanetitanium (IV) dimethyl,
(1-adamantylamido)dimethyl($\eta^5$-2-methylindenyl)silanetitanium (IV) dibenzyl,
(t-butylamido)dimethyl($\eta^5$-2-methylindenyl)silanetitanium (II) 1,4-diphenyl-1,3-butadiene,
(t-butylamido)dimethyl($\eta^5$-2-methylindenyl)silanetitanium (II) 1,3-pentadiene,
(t-butylamido)dimethyl($\eta^5$-2-methylindenyl)silanetitanium (III) 2-(N,N-dimethylamino)benzyl,
(t-butylamido)dimethyl($\eta^5$-2-methylindenyl)silanetitanium (IV) dimethyl,
(t-butylamido)dimethyl($\eta^5$-2-methylindenyl)silanetitanium (IV) dibenzyl,
(n-butylamido)diisopropoxy($\eta^5$-2-methylindenyl)silanetitanium (II) 1,4-diphenyl-1,3-butadiene,
(n-butylamido)diisopropoxy($\eta^5$-2-methylindenyl)silanetitanium (II) 1,3-pentadiene,
(n-butylamido)diisopropoxy($\eta^5$-2-methylindenyl)silanetitanium (III) 2-(N,N-dimethylamino)benzyl,
(n-butylamido)diisopropoxy($\eta^5$-2-methylindenyl)silanetitanium (IV) dimethyl,
(n-butylamido)diisopropoxy($\eta^5$-2-methylindenyl)silanetitanium (IV) dibenzyl,
(cyclododecylamido)diisopropoxy($\eta^5$-2-methylindenyl)-silanetitanium (II) 1,4-diphenyl-1,3-butadiene,
cyclododecylamido)diisopropoxy($\eta^5$-2-methylindenyl)-silanetitanium (II) 1,3-pentadiene,
(cyclododecylamido)diisopropoxy($\eta^5$-2-methylindenyl)-silanetitanium (III) 2-(N,N-dimethylamino)benzyl,
(cyclododecylamido)diisopropoxy($\eta^5$-2-methylindenyl)-silanetitanium (IV) dimethyl,
(cyclododecylamido)diisopropoxy($\eta^5$-2-methylindenyl)-silanetitanium (IV) dibenzyl,
(2,4,6-trimethylanilido)diisopropoxy($\eta^5$-2-methyl-indenyl)silanetitanium (II) 1,4-diphenyl-1,3-butadiene,
2,4,6-trimethylanilido)diisopropoxy($\eta^5$-2-methylindenyl)silanetitanium (II) 1,3-pentadiene, 2,4,6-trimethylanilido)diisopropoxy($\eta^5$-2-methylindenyl)
silanetitanium (III) 2-(N,N-dimethylamino)benzyl,
(2,4,6-trimethylanilido)diisopropoxy($\eta^5$-2-methylindenyl)
silanetitanium (IV) dimethyl,
(2,4,6-trimethylanilido)diisopropoxy($\eta^5$-2-methylindenyl)
silanetitanium (IV) dibenzyl,
(1-adamantylamido)diisopropoxy($\eta^5$-2-methylindenyl)
silanetitanium (II) 1,4-diphenyl-1,3-butadiene,
(1-adamantylamido)diisopropoxy($\eta^5$-2-methylindenyl)
silanetitanium (II) 1,3-pentadiene,
(1-adamantylamido)diisopropoxy($\eta^5$-2-methylindenyl)
silanetitanium (III) 2-(N,N-dimethylamino)benzyl,
(1-adamantylamido)diisopropoxy($\eta^5$-2-methylindenyl)
silanetitanium (IV) dimethyl,
(1-adamantylamido)diisopropoxy($\eta^5$-2-methylindenyl)
silanetitanium (IV) dibenzyl,
(n-butylamido)dimethoxy($\eta^5$-2-methylindenyl)
silanetitanium (II) 1,4-diphenyl-1,3-butadiene,
(n-butylamido)dimethoxy($\eta^5$-2-methylindenyl)
silanetitanium (II) 1,3-pentadiene,
(n-butylamido)dimethoxy($\eta^5$-2-methylindenyl)
silanetitanium (III) 2-(N,N-dimethylamino)benzyl,
(n-butylamido)dimethoxy($\eta^5$-2-methylindenyl)
silanetitanium (IV) dimethyl,
(n-butylamido)dimethoxy($\eta^5$-2-methylindenyl)
silanetitanium (IV) dibenzyl,
(cyclododecylamido)dimethoxy($\eta^5$-2-methylindenyl)
silanetitanium (II) 1,4-diphenyl-1,3-butadiene,
(cyclododecylamido)dimethoxy($\eta^5$-2-methylindenyl)
silanetitanium (II) 1,3-pentadiene,
(cyclododecylamido)dimethoxy($\eta^5$-2-methylindenyl)
silanetitanium (III) 2-(N,N-dimethylamino)benzyl,
(cyclododecylamido)dimethoxy($\eta^5$-2-methylindenyl)
silanetitanium (IV) dimethyl,
(cyclododecylamido)dimethoxy($\eta^5$-2-methylindenyl)
silanetitanium (IV) dibenzyl,
(2,4,6-trimethylanilido)dimethoxy($\eta^5$-2-methylindenyl)
silanetitanium (II) 1,4-diphenyl-1,3-butadiene,
(2,4,6-trimethylanilido)dimethoxy($\eta^5$-2-methylindenyl)
silanetitanium (II) 1,3-pentadiene,
(2,4,6-trimethylanilido)dimethoxy($\eta^5$-2-methylindenyl)
silanetitanium (III) 2-(N,N-dimethylamino)benzyl,
(2,4,6-trimethylanilido)dimethoxy($\eta^5$-2-methylindenyl)
silanetitanium (IV) dimethyl,
(2,4,6-trimethylanilido)dimethoxy($\eta^5$-2-methylindenyl)
silanetitanium (IV) dibenzyl,
(1-adamantylamido)dimethoxy($\eta^5$-2-methylindenyl)
silanetitanium (II) 1,4-diphenyl-1,3-butadiene,
(1-adamantylamido)dimethoxy($\eta^5$-2-methylindenyl)
silanetitanium (II) 1,3-pentadiene,
(1-adamantylamido)dimethoxy($\eta^5$-2-methylindenyl)
silanetitanium (III) 2-(N,N-dimethylamino)benzyl,
(1-adamantylamido)dimethoxy($\eta^5$-2-methylindenyl)
silanetitanium (IV) dimethyl,
(n-butylamido)ethoxymethyl($\eta^5$-2-methylindenyl)
silanetitanium (II) 1,4-diphenyl-1,3-butadiene,
(n-butylamido)ethoxymethyl($\eta^5$-2-methylindenyl)
silanetitanium (II) 1,3-pentadiene,
n-butylamido)ethoxymethyl($\eta^5$-2-methylindenyl)
silanetitaniumn (III) 2-(N,N-dimethylamino)benzyl,
(n-butylamido)ethoxymethyl($\eta^5$-2-methylindenyl)
silanetitanium (IV) dimethyl,
(n-butylamido)ethoxymethyl($\eta^5$-2-methylindenyl)
silanetitanium (IV) dibenzyl,
(cyclododecylamido)ethoxymethyl($\eta^5$-2-methylindenyl)
silanetitanium (II) 1,4-diphenyl-1,3-butadiene,
(cyclododecylamido)ethoxymethyl($\eta^5$-2-methylindenyl)
silanetitanium (II) 1,3-pentadiene,
(cyclododecylamido)ethoxymethyl($\eta^5$-2-methylindenyl)
silanetitanium (III) 2-(N,N-dimethylamino)benzyl,
(cyclododecylamido)ethoxymethyl($\eta^5$-2-methylindenyl)
silanetitanium (IV) dimethyl,
(cyclododecylamido)ethoxymethyl($\eta^5$-2-methylindenyl)
silanetitanium (IV) dibenzyl,
(2,4,6-trimethylanilido)ethoxymethyl($\eta^5$-2-methylindenyl)
silanetitanium (II) 1,4-diphenyl-1,3-butadiene,
(2,4,6-trimethylanilido)ethoxymethyl($\eta^5$-2-methylindenyl)
silanetitanium (II) 1,3-pentadiene,
(2,4,6-trimethylanilido)ethoxymethyl($\eta^5$-2-methylindenyl)
silanetitanium (III) 2-(N,N-dimethylamino)benzyl,
(2,4,6-trimethylanilido)ethoxymethyl($\eta^5$-2-methylindenyl)
silanetitanium (IV) dimethyl,
(2,4,6-trimethylanilido)ethoxymethyl($\eta^5$-2-methylindenyl)
silanetitanium (IV) dibenzyl,
(1-adamantylamido)ethoxymethyl($\eta^5$-2-methylindenyl)
silanetitanium (II) 1,4-diphenyl-1,3-butadiene,
(1-adamantylamido)ethoxymethyl($\eta^5$-2-methylindenyl)
silanetitanium (II) 1,3-pentadiene,
(1-adamantylamido)ethoxymethyl($\eta^5$-2-methylindenyl)
silanetitanium (III) 2-(N,N-dimethylamino)benzyl,
(1-adamantylamido)ethoxymethyl($\eta^5$-2-methylindenyl)
silanetitanium (IV) dimethyl,
(1-adamantylamido)ethoxymethyl($\eta^5$-2-methylindenyl)
silanetitanium (IV) dibenzyl, 2,3-dimethylindenyl complexes:

(t-butylamido)dimethyl($\eta^5$-2,3-dimethylindenyl)
silanetitanium (II) 1,4-diphenyl-1,3-butadiene,
(t-butylamido)dimethyl($\eta^5$-2,3-dimethylindenyl)
silanetitanium (II) 1,3-pentadiene,
(t-butylamido)dimethyl($\eta^5$-2,3-dimethylindenyl)
silanetitanium (III) 2-(N,N-dimethylamino)benzyl,
(t-butylamido)dimethyl($\eta^5$-2,3-dimethylindenyl)
silanetitanium (IV) dimethyl,
(t-butylamido)dimethyl($\eta^5$-2,3-dimethylindenyl)
silanetitanium (IV) dibenzyl,
(n-butylamido)dimethyl($\eta^5$-2,3-dimethylindenyl)
silanetitanium (II) 1,4diphenyl-1,3-butadiene,
(n-butylamido)dimethyl($\eta^5$-2,3-dimethylindenyl)
silanetitanium (II) 1,3-pentadiene,
(n-butylamido)dimethyl($\eta^5$-2,3-dimethylindenyl)-
silanetitanium (III) 2-(N,N-dimethylamino)benzyl,
(n-butylamido)dimethyl($\eta^5$-2,3-dimethylindenyl)
silanetitanium (IV) dimethyl,
(n-butylamido)dimethyl($\eta^5$-2,3-dimethylindenyl)
silanetitanium (IV) dibenzyl,
(cyclododecylamido)dimethyl($\eta^5$-2,3-dimethylindenyl)
silanetitanium (II) 1,4-diphenyl-1,3-butadiene,
(cyclododecylamido)dimethyl($\eta^5$-2,3-dimethylindenyl)
silanetitanium (II) 1,3-pentadiene,
(cyclododecylamido)dimethyl($\eta^5$-2,3-dimethylindenyl)
silanetitanium (III) 2-(N,N-dimethylamino)benzyl,
(cyclododecylamido)dimethyl($\eta^5$-2,3-dimethylindenyl)
silanetitanium (IV) dimethyl,
(cyclododecylamido)dimethyl($\eta^5$-2,3-dimethylindenyl)
silanetitanium (IV) dibenzyl,
(2,4,6-trimethylanilido)dimethyl($\eta^5$-2,3-dimethylindenyl)
silanetitanium (II) 1,4-diphenyl-1,3-butadiene,
(2,4,6-trimethylanilido)dimethyl($\eta^5$-2,3-dimethylindenyl)
silanetitanium (II) 1,3-pentadiene,
(2,4,6-trimethylanilido)dimethyl($\eta^5$-2,3-dimethylindenyl)
silanetitanium (III) 2-(N,N-dimethylamino)benzyl,
(2,4,6-trimethylanilido)dimethyl($\eta^5$-2,3-dimethylindenyl)
silanetitanium (IV) dimethyl, (2,4,6-trimethylanilido)dimethyl($\eta^5$-2,3-dimethylindenyl) silanetitanium (IV) dibenzyl,
(1-adamantylamido)dimethyl($\eta^5$-2,3-dimethylindenyl) silanetitanium (II) 1,4-diphenyl-1,3-butadiene,
(1-adamantylamido)dimethyl($\eta^5$-2,3-dimethylindenyl) silanetitanium (II) 1,3-pentadiene,
(1-adamantylamido)dimethyl($\eta^5$-2,3-dimethylindenyl) silanetitanium (III) 2-(N,N-dimethylamino)benzyl,
(1-adamantylamido)dimethyl($\eta^5$-2,3-dimethylindenyl) silanetitanium (IV) dimethyl,
(1-adamantylamido)dimethyl($\eta^5$-2,3-dimethylindenyl) silanetitanium (IV) dibenzyl,
(t-butylamido)dimethyl($\eta^5$-2,3-dimethylindenyl) silanetitanium (II) 1,4-diphenyl-1,3-butadiene,
(t-butylamido)dimethyl($\eta^5$-2,3-dimethylindenyl) silanetitanium (II) 1,3-pentadiene,
t-butylamido)dimethyl($\eta^5$-2,3-dimethylindenyl) silanetitanium (III) 2-(N,N-dimethylamino)benzyl,
(t-butylamido)dimethyl($\eta^5$-2,3-dimethylindenyl) silanetitanium (IV) dimethyl,
(t-butylamido)dimethyl($\eta^5$-2,3-dimethylindenyl) silanetitanium (IV) dibenzyl,
(n-butylamido)diisopropoxy($\eta^5$-2,3-dimethylindenyl) silanetitanium (II) 1,4-diphenyl-1,3-butadiene,
(n-butylamido)diisopropoxy($\eta^5$-2,3-dimethylindenyl) silanetitanium (II) 1,3-pentadiene,
(n-butylamido)diisopropoxy($\eta^5$-2,3-dimethylindenyl) silanetitanium (III) 2-(N,N-dimethylamino)benzyl,
(n-butylamido)diisopropoxy($\eta^5$-2,3-dimethylindenyl) silanetitanium (IV) dimethyl,
(n-butylamido)diisopropoxy($\eta^5$-2,3dimethylindenyl) silanetitanium (IV) dibenzyl,
(cyclododecylamido)diisopropoxy($\eta^5$-2,3-dimethylindenyl)-silanetitanium (II) 1,4-diphenyl-1,3-butadiene,
(cyclododecylamido)diisopropoxy($\eta^5$-2,3-dimethylindenyl)-silanetitanium (II) 1,3-pentadiene,
(cyclododecylamido)diisopropoxy($\eta^5$-2,3-dimethylindenyl)-silanetitanium (III) 2-(N,N-dimethylamino)benzyl,
(cyclododecylamido)diisopropoxy($\eta^5$-2,3-dimethylindenyl)-silanetitanium (IV) dimethyl,
(cyclododecylamido)diisopropoxy($\eta^5$-2,3-dimethylindenyl)-silanetitanium (IV) dibenzyl,
(2,4,6-trimethylanilido)diisopropoxy($\eta^5$-2,3-dimethylindenyl)silanetitanium (II) 1,4-diphenyl-1,3-butadiene,
(2,4,6-trimethylanilido)diisopropoxy($\eta^5$-2,3-dimethylindenyl)silanetitanium (II) 1,3-pentadiene,
(2,4,6-trimethylanilido)diisopropoxy(($\eta^5$-2,3-dimethylindenyl)silanetitanium (III) 2-(N,N-dimethylamino)benzyl,
(2,4,6-trimethylanilido)diisopropoxy($\eta^5$-2,3-dimethylindenyl)silanetitanium (IV) dimethyl,
(2,4,6-trimethylanilido)diisopropoxy($\eta^5$-2,3-dimethylindenyl)silanetitanium (IV) dibenzyl,
(1-adamantylamido)diisopropoxy($\eta^5$-2,3-dimethylindenyl) silanetitanium (II) 1,4-diphenyl-1,3-butadiene,
(1-adamantylamido)diisopropoxy($\eta^5$-2,3-dimethylindenyl) silanetitanium (II) 1,3-pentadiene,
(1-adamantylamido)diisopropoxy($\eta^5$-2,3-dimethylindenyl) silanetitanium (III) 2-(N,N-dimethylamino)benzyl,
(1-adamantylamido)diisopropoxy($\eta^5$-2,3-dimethylindenyl) silanetitanium (IV) dimethyl,
(1-adamantylamido)diisopropoxy($\eta^5$-2,3-dimethylindenyl) silanetitanium (IV) dibenzyl,
(n-butylamido)dimethoxy($\eta^5$-2,3-dimethylindenyl) silanetitanium (II) 1,4-diphenyl-1,3-butadiene,
(n-butylamido)dimethoxy($\eta^5$-2,3-dimethylindenyl) silanetitanium (II) 1,3-pentadiene,
(n-butylamido)dimethoxy($\eta^5$-2,3-dimethylindenyl) silanetitanium (III) 2-(N,N-dimethylamino)benzyl,
(n-butylamido)dimethoxy($\eta^5$-2,3-dimethylindenyl) silanetitanium (IV) dimethyl,
(n-butylamido)dimethoxy($\eta^5$-2,3-dimethylindenyl) silanetitanium (IV) dibenzyl,
(cyclododecylamido)dimethoxy($\eta^5$-2,3-dimethylindenyl) silanetitanium (II) 1,4-diphenyl-1,3-butadiene,
(cyclododecylamido)dimethoxy($\eta^5$-2,3-dimethylindenyl) silanetitanium (II) 1,3-pentadiene,
(cyclododecylamido)dimethoxy($\eta^5$-2,3-dimethylindenyl) silanetitanium (III) 2-(N,N-dimethylamino)benzyl,
cyclododecylamido)dimethoxy($\eta^5$-2,3-dimethylindenyl) silanetitanium (IV) dimethyl,
cyclododecylamido)dimethoxy($\eta^5$-2,3-dimethylindenyl) silanetitanium (IV) dibenzyl,
2,4,6-trimethylanilido)dimethoxy($\eta^5$-2,3-dimethyl-indenyl) silanetitanium (II) 1,4-diphenyl-1,3-butadiene,
(2,4,6-trimethylanilido)dimethoxy($\eta^5$-2,3-dimethylindenyl) silanetitanium (II) 1,3-pentadiene,
(2,4,6-trimethylanilido)dimethoxy($\eta^5$-2,3-dimethylindenyl) silanetitanium (III) 2-(N,N-dimethylamino)benzyl,
(2,4,6-trimethylanilido)dimethoxy($\eta^5$-2,3-dimethylindenyl) silanetitanium (IV) dimethyl,
(2,4,6-trimethylanilido)dimethoxy($\eta^5$-2,3-dimethylindenyl) silanetitanium (IV) dibenzyl,
(1-adamantylamido)dimethoxy($\eta^5$-2,3-dimethylindenyl) silanetitanium (II) 1,4-diphenyl-1,3-butadiene,
(1-adamantylamido)dimethoxy($\eta^5$-2,3-dimethylindenyl) silanetitanium (II) 1,3-pentadiene,
(1-adamantylamido)dimethoxy($\eta^5$-2,3-dimethylindenyl) silanetitanium (III) 2-(N,N-dimethylamino)benzyl,
(1-adamantylamido)dimethoxy($\eta^5$-2,3-dimethylindenyl) silanetitanium (IV) dimethyl,
(1-adamantylamido)dimethoxy($\eta^5$-2,3-dimethylindenyl) silanetitanium (IV) dibenzyl,
(n-butylamido)ethoxymethyl($\eta^5$-2,3-dimethylindenyl)-silanetitanium (II) 1,4-diphenyl-1,3-butadiene,
(n-butylamido)ethoxymethyl($\eta^5$-2,3-dimethylindenyl) silanetitanium (II) 1,3-pentadiene,
(n-butylamido)ethoxymethyl($\eta^5$-2,3-dimethylindenyl) silanetitanium (III) 2-(N,N-dimethylamino)benzyl,
(n-butylamido)ethoxymethyl($\eta^5$-2,3-dimethylindenyl) silanetitanium (IV) dimethyl,
(n-butylamido)ethoxymethyl($\eta^5$-2,3-dimethylindenyl) silanetitanium (IV) dibenzyl,
(cyclododecylamido)ethoxymethyl($\eta^5$-2,3-dimethylindenyl)silanetitanium (II) 1,4-diphenyl-1,3-butadiene,
(cyclododecylamido)ethoxymethyl($\eta^5$-2,3-dimethylindenyl)silanetitanium (II) 1,3-pentadiene,
(cyclododecylamido)ethoxymethyl($\eta^5$-2,3-dimethylindenyl)silanetitanium (III) 2-(N,N-dimethylamino)benzyl,
(cyclododecylamido)ethoxymethyl($\eta^5$-2,3-dimethylindenyl)silanetitanium (IV) dimethyl,
(cyclododecylamido)ethoxymethyl($\eta^5$-2,3-dimethylindenyl)silanetitanium (IV) dibenzyl,
(2,4,6-trimethylanilido)ethoxymethyl($\eta^5$-2,3-dimethylindenyl)silanetitanium (II) 1,4-diphenyl-1,3-butadiene,
(2,4,6-trimethylanilido)ethoxymethyl($\eta^5$-2,3-dimethylindenyl)silanetitanium (II) 1,3-pentadiene,
(2,4,6-trimethylanilido)ethoxymethyl($\eta^5$-2,3-dimethylindenyl)silanetitanium (III) 2-(N,N-dimethylamino)benzyl, (2,4,6-trimethylanilido)ethoxymethyl($\eta^5$-2,3-dimethylindenyl)silanetitanium (IV) dimethyl,
(2,4,6-trimethylanilido)ethoxymethyl($\eta^5$-2,3-dimethylindenyl)silanetitanium (IV) dibenzyl,
(1-adamantylamido)ethoxymethyl($\eta^5$-2,3-dimethylindenyl)silanetitanium (II) 1,4-diphenyl-1,3-butadiene,
(1-adamantylamido)ethoxymethyl($\eta^5$-2,3dimethylindenyl)silanetitaniumn (II) 1,3-pentadiene,
(1-adamantylamido)ethoxymethyl($\eta^5$-2,3-dimethylindenyl)silanetitanium (III) 2-(N,N-dimethylamino)benzyl,
(1-adamantylamido)ethoxymethyl($\eta^5$-2,3-dimethylindenyl)silanetitanium (IV) dimethyl,
(1-adamantylamido)ethoxymethyl($\eta^5$-2,3-dimethylindenyl)silanetitanium (IV) dibenzyl, 3-methylindenyl complexes:

(t-butylamido)dimethyl($\eta^5$-3-methylindenyl)silanetitanium (II) 1,4-diphenyl-1,3-butadiene,
(t-butylamido)dimethyl($\eta^5$-3-methylindenyl)silanetitanium (II) 1,3-pentadiene,
(t-butylamido)dimethyl($\eta^5$-3-methylindenyl)silanetitanium (III) 2-(N,N-dimethylamino)benzyl,
(t-butylamido)dimethyl($\eta^5$-3-methylindenyl)silanetitanium (IV) dimethyl,
(t-butylamido)dimethyl($\eta^5$-3-methylindenyl)silanetitanium (IV) dibenzyl,
(n-butylamido)dimethyl($\eta^5$-3-methylindenyl)silanetitanium (II) 1,4-diphenyl-1,3-butadiene,
(n-butylamido)dimethyl($\eta^5$-3-methylindenyl)silanetitanium (II) 1,3-pentadiene,
(n-butylamido)dimethyl($\eta^5$-3-methylindenyl)silanetitanium (III) 2-(N,N-dimethylamino)benzyl,
(n-butylamido)dimethyl($\eta^5$-3-methylindenyl)silanetitanium (IV) dimethyl,
(n-butylamido)dimethyl($\eta^5$-3-methylindenyl)silanetitanium (IV) dibenzyl,
(cyclododecylamido)dimethyl($\eta^5$-3-methylindenyl)silanetitanium (II) 1,4-diphenyl-1,3-butadiene,
(cyclododecylamido)dimethyl($\eta^5$-3-methylindenyl)silanetitanium (II) 1,3-pentadiene,
(cyclododecylamido)dimethyl($\eta^5$-3-methylindenyl)silanetitanium (III) 2-(N,N-dimethylamino)benzyl,
(cyclododecylamido)dimethyl($\eta^5$-3-methylindenyl)silanetitanium (IV) dimethyl,
(cyclododecylamido)dimethyl($\eta^5$-3-methylindenyl)silanetitanium (IV) dibenzyl,
(2,4,6-trimethylanilido)dimethyl($\eta^5$-3-methylindenyl)silanetitanium (II) 1,4-diphenyl-1,3-butadiene,
(2,4,6-trimethylanilido)dimethyl($\eta^5$-3-methylindenyl)silanetitaniumn (II) 1,3-pentadiene,
(2,4,6-trimethylanilido)dimethyl($\eta^5$-3-methylindenyl)silanetitanium (III) 2-(N,N-dimethylamino)benzyl,
(2,4,6-trimethylanilido)dimethyl($\eta^5$-3-methylindenyl)silanetitanium (IV) dimethyl,
(2,4,6-trimethylanilido)dimethyl($\eta^5$-3-methylindenyl)silanetitanium (IV) dibenzyl,
(1-adamantylamido)dimethyl($\eta^5$-3-methylindenyl)silanetitanium (II) 1,4-diphenyl-1,3-butadiene,
(1-adamantylamido)dimethyl($\eta^5$-3-methylindenyl)silanetitanium (II) 1,3-pentadiene,
(1-adamantylamido)dimethyl($\eta^5$-3-methylindenyl)silanetitanium (III) 2-(N,N-dimethylamino)benzyl,
(1-adamantylamido)dimethyl($\eta^5$-3-methylindenyl)silanetitanium (IV) dimethyl,
(1-adamantylamido)dimethyl($\eta^5$-3-methylindenyl)silanetitanium (IV) dibenzyl, (t-butylamido)dimethyl($\eta^5$-3-methylindenyl)silanetitanium (II) 1,4-diphenyl-1,3-butadiene,
(t-butylamido)dimethyl($\eta^5$-3-methylindenyl)silanetitanium (II) 1,3-pentadiene,
(t-butylamido)dimethyl($\eta^5$-3-methylindenyl)silanetitanium (III) 2-(N,N-dimethylamino)benzyl,
(t-butylamido)dimethyl($\eta^5$-3-methylindenyl)silanetitanium (IV) dimethyl,
(t-butylamido)dimethyl($\eta^5$-3-methylindenyl)silanetitanium (IV) dibenzyl,
(n-butylamido)diisopropoxy($\eta^5$-3-methylindenyl)silanetitanium (II) 1,4-diphenyl-1,3-butadiene,
(n-butylamido)diisopropoxy($\eta^5$-3-methylindenyl)silanetitanium (II) 1,3-pentadiene,
(n-butylamido)diisopropoxy($\eta^5$-3-methylindenyl)silanetitanium (III) 2-(N,N-dimethylamino)benzyl,
(n-butylamido)diisopropoxy($\eta^5$-3-methylindenyl)silanetitanium (IV) dimethyl,
(n-butylamido)diisopropoxy($\eta^5$-3-methylindenyl)silanetitaniumn (IV) dibenzyl,
(cyclododecylamido)diisopropoxy($\eta^5$-3-methylindenyl)-silanetitanium (II) 1,4-diphienyl-1,3-butadiene,
(cyclododecylamido)diisopropoxy($\eta^5$-3-methylindenyl)-silanetitanium (II) 1,3-pentadiene,
(cyclododecylamido)diisopropoxy($\eta^5$-3-methylindenyl)-silanetitanium (III) 2-(N,N-dimethylamino)benzyl,
(cyclododecylamido)diisopropoxy($\eta^5$-3-methylindenyl)-silanetitanium (IV) dimethyl,
(cyclododecylamido)diisopropoxy($\eta^5$-3-methylindenyl)-silanetitanium (IV) dibenzyl,
(2,4,6-trimethylanilido)diisopropoxy($\eta^5$-3-methyl-indonyl)silanetitanium (II) 1,4-diphenyl-1,3-butadiene,
(2,4,6-trimethylanilido)diisopropoxy($\eta^5$-3-methylindenyl)silanetitanium (II) 1,3-pentadiene,
(2,4,6-trimethylanilido)diisopropoxy($\eta^5$-3-methylin-denyl)silanetitanium (III) 2-(N,N-dimethylamino)benzyl,
(2,4,6-trimethylanilido)diisopropoxy($\eta^5$-3-methylindenyl)silanetitanium (IV) dimethyl,
(2,4,6-trimethylanilido)diisopropoxy($\eta^5$-3-methylindenyl)silanetitanium (IV) dibenzyl,
(1-adamantylamido)diisopropoxy($\eta^5$-3-methylindenyl)silanetitanium (II) 1,4-diphenyl-1,3-butadiene,
(1-adamantylamido)diisopropoxy($\eta^5$-3-methylindenyl)silanetitanium (II) 1,3-pentadiene,
(1-adamantylamido)diisopropoxy($\eta^5$-3-methylindenyl)silanetitanium (III) 2-(N,N-dimethylamino)benzyl,
(1-adamantylamido)diisopropoxy($\eta^5$-3-methylindenyl)silanetitanium (IV) dimethyl,
(1-adamantylamido)diisopropoxy($\eta^5$-3-methylindenyl)silanetitanium (IV) dibenzyl,
(n-butylamido)dimethoxy($\eta^5$-3-methylindenyl)silanetitanium (II) 1,4-diphenyl-1,3-butadiene,
(n-butylamido)dimethoxy($\eta^5$-3-methylindenyl)silanetitanium (II) 1,3-pentadiene,
(n-butylamido)dimethoxy($\eta^5$-3-methylindenyl)silanetitanium (III) 2-(N,N-dimethylamino)benzyl,
(n-butylamido)dimethoxy($\eta^5$-3-methylindenyl)silanetitanium (IV) dimethyl,
(n-butylamido)dimethoxy($\eta^5$-3-methylindenyl)silanetitanium (IV) dibenzyl,
(cyclododecylamido)dimethoxy($\eta^5$-3-methylindenyl)silanetitanium (II) 1,4-diphenyl-1,3-butadiene,
(cyclododecylamido)dimethoxy($\eta^5$-3-methylindenyl)silanetitanium (II) 1,3-pentadiene,
(cyclododecylamido)dimethoxy($\eta^5$-3-methylindenyl)silanetitanium (III) 2-(N,N-dimethylamino)benzyl,
(cyclododecylamido)dimethoxy($\eta^53$-methylindenyl)silanetitanium (IV) dimethyl, (cyclododecylamido)dimethoxy($\eta^5$-3-methylindenyl)
  sitanetitanium (IV) dibenzyl,
(2,4,6-trimethylanilido)dimethoxy($\eta^5$-3-methylindenyl)
  silanetitanium (II) 1,4-diphenyl-1,3-butadiene,
(2,4,6-trimethylanilido)dimethoxy($\eta^5$-3-methylindenyl)
  silanetitanium (II) 1,3-pentadiene,
(2,4,6-trimethylanilido)dimethoxy($\eta^5$-3-methylindenyl)
  silanetitanium (III) 2-(N,N-dimethylamino)benzyl,
(2,4,6-trimethylanilido)dimethoxy($\eta^5$-3-methylindenyl)
  silanetitanium (IV) dimethyl,
(2,4,6-trimethylanilido)dimethoxy($\eta^5$-3-methylindenyl)
  silanetitanium (IV) dibenzyl,
(1-adamantylamido)dimethoxy($\eta^5$-3-methylindenyl)
  silanetitanium (II) 1,4-diphenyl-1,3-butadiene,
(1-adamantylamido)dimethoxy($\eta^5$-3-methylindenyl)
  silanetitanium (II) 1,3-pentadiene,
(1-adamantylamido)dimethoxy($\eta^5$-3-methylindenyl)
  silanetitanium (III) 2-(N,N-dimethylamino)benzyl,
(1-adamantylamido)dimethoxy($\eta^5$-3-methylindenyl)
  silanetitanium (IV) dimethyl,
(1-adamantylamido)dimethoxy($\eta^5$-3-methylindenyl)
  silanetitanium (IV) dibenzyl,
(n-butylamido)ethoxymethyl($\eta^5$-3-methylindenyl)
  silanetitanium (II) 1,4-diphenyl-1,3-butadiene,
(n-butylamido)ethoxymethyl($\eta^5$-3-methylindenyl)
  silanetitanium (II) 1,3-pentadiene,
(n-butylamido)ethoxymethyl($\eta^5$-3-methylindenyl)
  silanetitanium (III) 2-(N,N-dimethylamino)benzyl,
(n-butylamido)ethoxymethyl($\eta^5$-3-methylindenyl)
  silanetitanium (IV) dimethyl,
(n-butylamido)ethoxymethyl($\eta^5$-3-methylindenyl)
  silanetitanium (IV) dibenzyl,
(cyclododecylamido)ethoxymethyl($\eta^5$-3-methylindenyl)
  silanetitanium (II) 1,4-diphenyl-1,3-butadiene,
(cyclododecylamido)ethoxymethyl($\eta^5$-3-methylindenyl)
  silanetitanium (II) 1,3-pentadiene,
(cyclododecylamido)ethoxymethyl($\eta^5$-3-methylindenyl)
  silanetitanium (III) 2-(N,N-dimethylwanino)benzyl,
(cyclododecylamido)ethoxymethyl($\eta^5$-3-methylindenyl)
  silanetitanium (IV) dimethyl,
(cyclododecylamido)ethoxymethyl($\eta^5$-3-methylindenyl)
  silanetitanium (IV) dibenzyl,
(2,4,6-trimethylanilido)ethoxymethyl($\eta^5$-3-methylindenyl)
  silanetitanium (II) 1,4-diphenyl-1,3-butadiene,
(2,4,6-trimethylanilido)ethoxymethyl($\eta^5$-3-methyl indenyl)
  silanetitanium (II) 1,3-pentadiene,
(2,4,6-trimethylanilido)ethoxymethyl($\eta^5$-3-methylindenyl)
  silanetitanium (III) 2-(N,N-dimethylamino)benzyl,
(2,4,6-trimethylanilido)ethoxymethyl($\eta^5$-3-methylindenyl)
  silanetitanitin (IV) dimethyl,
(2,4,6-trimethylanilido)ethoxymethyl($\eta^5$-3-methylindenyl)
  silanetitanium (IV) dibenzyl,
(1-adamantylamido)ethoxymethyl($\eta^5$-3-methylindenyl)
  silanetitanium (II) 1,4-diphenyl-1,3-butadiene,
(1-adamantylamido)ethoxymethyl($\eta^5$-3-methylindenyl)
  silanetitanium (II) 1,3-pentadiene,
(1-adamantylamido)ethoxymethyl($\eta^5$-3-methylindenyl)
  silanetitanium (III) 2-(N,N-dimethylamino)benzyl,
(1-adamantylamido)ethoxymethyl($\eta^5$-3-methylindenyl)
  silanetitanium (IV) dimethyl,
(1-adamantylamido)ethoxymethyl($\eta^5$-3-methylindenyl)
  silanetitanium (IV) dibenzyl, 2-methyl-3-ethylindenyl complexes:

(t-butylamido)dimethyl($\eta^5$-2-methyl-3-ethylindenyl)
  silanetitanium (II) 1,4-diphenyl-1,3-butadiene,
(t-butylamido)dimethyl($\eta^5$-2-methyl-3-ethylindenyl)
  silanetitanium (II) 1,3-pentadiene,
(t-butylamido)dimethyl($\eta^5$-2-methyl-3-ethylindenyl)
  silanetitanium (III) 2-(N,N-dimethylamino)benzyl,
(t-butylamido)dimethyl($\eta^5$-2-methyl-3-ethylindenyl)
  silanetitanium (IV) dimethyl,
(t-butylamido)dimethyl($\eta^5$-2-methyl-3-ethylindenyl)
  silanetitanium (IV) dibenzyl,
(n-butylamido)dimethyl($\eta^5$-2-methyl-3-ethylindenyl)-
  silanetitanium (II) 1,4-diphenyl-1,3-butadiene,
(n-butylamido)dimethyl($\eta^5$-2-methyl-3-ethylindenyl)
  silanetitanium (II) 1,3-pentadiene,
(n-butylamido)dimethyl($\eta^5$-2-methyl-3-ethylindenyl)-
  silanetitanium (III) 2-(N,N-dimethylamino)benzyl,
(n-butylamido)dimethyl($\eta^5$-2-methyl-3-ethylindenyl)
  silanetitanium (IV) dimethyl,
(n-butylamido)dimethyl($\eta^5$-2-methyl-3-ethylindenyl)
  silanetitanium (IV) dibenzyl,
(cyclododecylamido)dimethyl($\eta^5$-2-methyl-3-ethylindenyl)
  silanetitanium (II) 1,4-diphenyl-1,3-butadiene,
(cyclododecylamido)dimethyl($\eta^5$-2-methyl-3-ethylindenyl)
  silanetitanium (II) 1,3-pentadiene,
(cyclododecylamido)dimethyl($\eta^5$-2-methyl-3-ethylindenyl)
  silanetitanium (III) 2-(N,N-dimethylamino)benzyl,
(cyclododecylamido)dimethyl(-2-methyl-3-ethylindenyl)
  silanetitanium (IV) dimethyl,
(cyclododecylamido)dimethyl($\eta^5$-2-methyl-3-ethylindenyl)
  silanetitanium (IV) dibenzyl,
(2,4,6-trimethylanilido)dimethyl($\eta^5$-2-methyl-3-ethyl-indenyl)silanetitanium (II) 1,4-diphenyl-1,3-butadiene,
(2,4,6-trimethylanilido)dimethyl($\eta^5$-2-methyl-3-ethylindenyl)silanetitanium (II) 1,3-pentadiene,
(2,4,6-trimethylanilido)dimethyl($\eta^5$-2-methyl-3-ethylindenyl)silanetitanium (III) 2-(N,N-dimethylamino)benzyl,
(2,4,6-trimethylanilido)dimethyl($\eta^5$-2-methyl-3-ethylindenyl)silanetitanium (IV) dimethyl,
(2,4,6-trimethylanilido)dimethyl($\eta^5$-2-methyl-3-ethylindenyl)silanetitanium (IV) dibenzyl,
(1-adamantylamido)dimethyl($\eta^5$-2-methyl-3-ethylindenyl)
  silanetitanium (II) 1,4-diphenyl-1,3-butadiene,
(1-adamantylamido)dimethyl($\eta^5$-2-methyl-3-ethylindenyl)
  silanetitanium (II) 1,3-pentadiene,
(1-adamantylamido)dimethyl($\eta^5$-2-methyl-3-ethylindenyl)
  silanetitanium (III) 2-(N,N-dimethylamino)benzyl,
(1-adamantylamido)dimethyl($\eta^5$-2-methyl-3-ethylindenyl)
  silanetitanium (IV) dimethyl,
(1-adamantylamido)dimethyl($\eta^5$-2-methyl-3-ethylindenyl)
  silanetitanium (IV) dibenzyl,
(t-butylamido)dimethyl($\eta^5$-2-methyl-3-ethylindenyl)-
  silanetitanium (II) 1,4-diphenyl-1,3-butadiene,
(t-butylamido)dimethyl($\eta^5$-2-methyl-3-ethylindenyl)
  silanetitanium (II) 1,3-pentadiene,
(t-butylamido)dimethyl($\eta^5$-2-methyl-3-ethylindenyl)-
  silanetitanium (III) 2-(N,N-dimethylamino)benzyl,
(t-butylamido)dimethyl($\eta^5$-2-methyl-3-ethylindenyl)
  silanetitanium (IV) dimethyl,
(t-butylamido)dimethyl($\eta^5$-2-methyl-3-ethylindenyl)
  silanetitanium (IV) dibenzyl,
(n-butylamido)diisopropoxy($\eta^5$-2-methyl-3-ethyl-indenyl)
  silanetitanium (II) 1,4-diphenyl-1,3-butadiene,
(n-butylamido)diisopropoxy($\eta^5$-2-methyl-3-ethylindenyl)
  silanetitanium (II) 1,3-pentadiene,
(n-butylamido)diisopropoxy($\eta^5$-2-methyl-3-ethylindenyl)
  silanetitanium (III) 2-(N,N-dimethylamino)benzyl,
(n-butylamido)diisopropoxy($\eta^5$-2-methyl-3-ethylindenyl)
  silanetitanium (IV) dimethyl, (n-butylamido)diisopropoxy($\eta^5$-2-methyl-3-ethylindenyl)silanetitanium (IV) dibenzyl,
(cyclododecylamido)diisopropoxy(-2-methyl-3-ethyl-indenyl)silanetitanium (II) 1,4-diphenyl-1,3-butadiene,
(cyclododecylamido)diisopropoxy($\eta^5$-2-methyl-3-ethylindenyl)-silanetitanium (II) 1,3-pentadiene,
(cyclododecylamido)diisopropoxy($\eta^5$-2-methyl-3-ethylindenyl)-silanetitanium (III) 2-(N,N-dimethylamino)benzyl,
(cyclododecylamido)diisopropoxy($\eta^5$-2-methyl-3-ethylindenyl)-silanetitanium (IV) dimethyl,
(cyclododecylamido)diisopropoxy($\eta^5$-2-methyl-3-ethylindenyl)-silanetitanium (IV) dibenzyl,
(2,4,6-trimethylanilido)diisopropoxy($\eta^5$-2-methyl-3-ethylindenyl)silanetitanium (II) 1,4-diphenyl-1,3-butadiene,
(2,4,6-trimethylanilido)diisopropoxy($\eta^5$-2-methyl-3-ethylindenyl)silanetitanium (II) 1,3-pentadiene,
(2,4,6-trimethylanilido)diisopropoxy($\eta^5$-2-methyl-3-ethylindenyl)silanetitanium (III) 2-(N,N-dimethylamino)benzyl,
(2,4,6-trimethylanilido)diisopropoxy($\eta^5$-2-methyl-3-ethylindenyl)silanetitanium (IV) dimethyl,
(2,4,6-trimethylanilido)diisopropoxy($\eta^5$-2-methyl-3-ethylindenyl)silanetitanium (IV) dibenzyl,
(1-adamantylamido)diisopropoxy($\eta^5$-2-methyl-3-ethylindenyl)silanetitanium (II) 1,4-diphenyl-1,3-butadiene,
(1-adamantylamido)diisopropoxy($\eta^5$-2-methyl-3-ethylindenyl)silanetitanium (II) 1,3-pentadiene,
(1-adamantylamido)diisopropoxy($\eta^5$-2-methyl-3-ethylindenyl)silanetitanium (III) 2-(N,N-dimethylamino)benzyl,
(1-adamantylamido)diisopropoxy($\eta^5$-2-methyl-3-ethylindenyl)silanetitanium (IV) dimethyl,
(1-adamantylamido)diisopropoxy($\eta^5$-2-methyl-3-ethylindenyl)silanetitanium (IV) dibenzyl,
(n-butylamido)dimethoxy($\eta^5$-2-methyl-3-ethylindenyl)silanetitanium (II) 1,4-diphenyl-1,3-butadiene,
(n-butylamido)dimethoxy($\eta^5$-2-methyl-3-ethylindenyl)silanetitanium (II) 1,3-pentadiene,
(n-butylamido)dimethoxy($\eta^5$-2-methyl-3-ethylindenyl)silanetitanium (III) 2-(N,N-dimethylamino)benzyl,
(n-butylamido)dimethoxy($\eta^5$-2-methyl-3-ethylindenyl)silanetitanium (IV) dimethyl,
(n-butylamido)dimethoxy($\eta^5$-2-methyl-3-ethylindenyl)silanetitanium (IV) dibenzyl,
(cyclododecylamido)dimethoxy($\eta^5$-2-methyl-3-ethyl-indenyl)silanetitanium (II) 1,4-diphenyl-1,3-butadiene,
(cyclododecylamido)dimethoxy($\eta^5$-2-methyl-3-ethylindenyl)silanetitanium (II) 1,3-pentadiene,
(cyclododecylamido)dimethoxy($\eta^5$-2-methyl-3-ethylindenyl)silanetitanium (III) 2-(N,N-dimethylamino)benzyl,
(cyclododecylamido)dimethoxy($\eta^5$-2-methyl-3-ethylindenyl)silanetitanium (IV) dimethyl,
(cyclododecylamido)dimethoxy($\eta^5$-2-methyl-3-ethylindenyl)silanetitanium (IV) dibenzyl,
(2,4,6-trimethylanilido)dimethoxy($\eta^5$-2-methyl-3-ethylindenyl)silanetitanium (II) 1,4-diphenyl-1,3-butadiene,
(2,4,6-trimethylanilido)dimethoxy($\eta^5$-2-methyl-3-ethylindenyl)silanetitanium (II) 1,3-pentadiene,
(2,4,6-trimethylanilido)dimethoxy($\eta^5$-2-methyl-3-ethylindenyl)silanetitanium (III) 2-(N,N-dimethylamino)benzyl,
(2,4,6-trimethylanilido)dimethoxy($\eta^5$-2-methyl-3-ethylindenyl)silanetitanium (IV) dimethyl,
(2,4,6-trimethylanilido)dimethoxy($\eta^5$-2-methyl-3-ethylindenyl)silanetitanium (IV) dibenzyl,
(1-adamantylamido)dimethoxy($\eta^5$-2-methyl-3-ethylindenyl)silanetitanium (II) 1,4-diphenyl-1,3-butadiene,
(1-adamantylamido)dimethoxy($\eta^5$-2-methyl-3-ethylindenyl)silanetitanium (II) 1,3-pentadiene,
(1-adamantylamido)dimethoxy($\eta^5$-2-methyl-3-ethyindenyl)silanetitanium (III) 2-(N,N-dimethylamino)benzyl,
(1-adamantylamido)dimethoxy($\eta^5$-2-metbyl-3-ethylindenyl)silanetitanium (IV) dimethyl,
(1-adamantylamido)dimethoxy($\eta^5$-2-methyl-3-ethylindenyl)silanetitanium (IV) dibenzyl,
(n-butylamido)ethoxymethyl($\eta^5$-2-methyl-3-ethyl-indenyl)silanetitanium (II) 1,4-diphenyl-1,3-butadiene,
(n-butylamido)ethoxymethyl($\eta^5$-2-methyl-3-ethylindenyl)silanetitanium (II) 1,3-pentadiene,
(n-butylamido)ethoxymethyl($\eta^5$-2-methyl-3-ethylindenyl)silanetitanium (III) 2-(N,N-dimethylamino)benzyl,
(n-butylamido)ethoxymethyl($\eta^5$-2-methyl-3-ethylindenyl)silanetitanium (IV) dimethyl,
(n-butylamido)ethoxymethyl($\eta^5$-2-methyl-3-ethylindenyl)silanetitanium (IV) dibenzyl,
(cyclododecylamido)ethoxymethyl($\eta^5$-2-methyl-3-ethyl-indenyl)silane-titanium (I) 1,4-diphenyl-1,3-butadiene,
(cyclododecylamido)ethoxymethyl($\eta^5$-2-methyl-3-ethylindenyl)silane-titanium (II) 1,3-pentadiene,
(cyclododecylamido)ethoxymethyl($\eta^5$-2-methyl-3-ethylindenyl)silane-titanium (III) 2-(N,N-dimethylamino)benzyl,
(cyclododecylamido)ethoxymethyl($\eta^5$-2-methyl-3-ethylindenyl)silanetitanium (IV) dimethyl,
(cyclododecylamido)ethoxymethyl($\eta^5$-2-methyl-3-ethylindenyl)silanetitanium (IV) dibenzyl,
(2,4,6-trimethylanilido)ethoxymethyl($\eta^5$-2-methyl-3-ethylindenyl)silanetitanium (II) 1,4-diphenyl-1,3-butadiene,
(2,4,6-trimethylanilido)ethoxymethyl($\eta^5$-2-methyl-3-ethylindenyl)silanetitanium (II) 1,3-pentadiene,
(2,4,6-trimethylanilido)ethoxymethyl($\eta^5$-2-methyl-3-ethylindenyl)silanetitanium (III) 2N,N-dimethylamino)benzyl,
(2,4,6-trimethylanilido)ethoxymethyi($\eta^5$-2-methyl-3-ethylindenyl)silanetitanium (IV) dimethyl,
(2,4,6-trimethylanilido)ethoxymethyl($\eta^5$-2-methyl-3-ethylindenyl)silanetitanium (IV) dibenzyl,
(1-adamantylamido)ethoxymethyl($\eta^5$-2-methyl-3-ethylindenyl)silanetitanium (II) 1,4-diphenyl-1,3-butadiene,
(1-adamantylamido)ethoxymethyl($\eta^5$-2-methyl-3-ethylindenyl)silanetitanium (II) 1,3-pentadiene,
(1-adamantylamido)ethoxymethyl($\eta^5$-2-methyl-3-ethylindenyl)silanetitanium (III) 2-(N,N-dimethylamino)benzyl,
(1-adamantylamido)ethoxymethyl($\eta^5$-2-methyl-3-ethylindenyl)silanetitanium (IV) dimethyl,
(1-adamantylamido)ethoxymethyl($\eta^5$-2-methyl-3-ethylindenyl)silanetitanium (IV) dibenzyl, 2,3,4,6-tetramethylindenyl complexes:

(t-butylamido)dimethyl($\eta^5$-2,3,4,6-tetramethyl-indenyl)silanetitanium (II) 1,4-diphenyl-1,3-butadiene,
(t-butylamido)dimethyl($\eta^5$-2,3,4,6-tetramethylindenyl)silanetitanium (II) 1,3-pentadiene,
(t-butylamido)dimethyl($\eta^5$-2,3,4,6-tetramethyl-indenyl)silanetitanium (III) 2-(N,N-dimnethylamino)benzyl, (t-butylamido)dimethyl($\eta^5$2,3,4,6-tetramethylindenyl) silanetitanium (IV) dimethyl,
(t-butylamido)dimethyl($\eta^5$-2,3,4,6-tetramethylindenyl) silanetitanium (IV) dibenzyl,
(n-butylamido)dimethyl($\eta^5$-2,3,4,6-tetramethyl-indenyl) silanetitanium (II) 1,4-diphenyl-1,3-butadiene,
(n-batylamido)dimethyl($\eta^5$-2,3,4,6-tetramethylindenyl) silanetitanium (II) 1,3-pentadiene,
(n-butylamido)dimethyl($\eta^5$-2,3,4,6-tetramethylindenyl)-silanetitanium (III) 2-(N,N-dimethylamino)benzyl,
(n-butylamido)dimethyl($\eta^5$-2,3,4,6-tetramethylindenyl) silanetitanium (IV) dimethyl,
(n-butylamido)dimethyl($\eta^5$-2,3,4,6-tetramethylindenyl) silanetitanium (IV) dibenzyl,
(cyclododecylamido)dimethyl($\eta^5$-2,3,4,6-tetramethylindenyl)silanetitanium (II) 1,4-diphenyl-1,3-butadiene,
(cyclododecylamido)dimethyl($\eta$5-2,3,4,6-tetramethylindenyl)silanetitanium (II) 1,3-pentadiene,
(cyclododecylamido)dimethyl($\eta$5-2,3,4,6-tetramethylindenyl)silanetitanium (III) 2-(N,N-dimethylamino)benzyl,
(cyclododecylamido)dimethyl($\eta^5$-2,3,4,6-tetramethylindenyl)silanetitanium (IV) dimethyl,
(cyclododecylamido)dimethyl($\eta^5$-2,3,4,6-tetramethylindenyl)silanetitanium (IV) dibenzyl,
(2,4,6-trimethylanitido)dimethyl($\eta^5$-2,3,4,6-tetramethyl-indenyl)silanetitanium (II) 1,4-diphenyl-1,3-butadiene,
(2,4,6-trimethylanilido)dimethyl($\eta^5$-2,3,4,6-tetrarnethylindenyl)silanetitanium (II) 1,3-pentadiene,
(2,4,6-trimethylanilido)dimethyl($\eta^5$-2,3,4,6-tetramethyl-indenyl)silanetitanium (III) 2-(N,N-dimethylamino)benzyl,
(2,4,6-trimethylanilido)dimethyl($\eta^5$-2,3,4,6-tetramethylindenyl)silanetitanium (IV) dimethyl,
(2,4,6-trimethylanilido)dimethyl($\eta^5$-2,3,4,6-tetramethylindenyl)silanetitanium (IV) dibenzyl,
(1-adamantylamido)dimethyl($\eta^5$-2,3,4,6-tetramethylindenyl)silanetitanium (II) 1,4-diphenyl-1,3-butadiene,
(1-adamantylamido)dimethyl($\eta^5$-2,3,4,6-tetramethylindenyl)silanetitanium (II) 1,3-pentadiene,
(1-adamantylamido)dimethyl($\eta^5$-2,3,4,6-tetramethylindenyl)silanetitanium (III) 2-(N,N-dimethylamino)benzyl,
(1-adamantylamido)dimethyl($\eta^5$-2,3,4,6-tetramethylindenyl)silanetitanium (IV) dimethyl,
(1-adamantylamido)dimethyl($\eta^5$-2,3,4,6-tetramethylindenyl)silanetitanium (IV) dibenzyl,
(t-butylamido)dimethyl($\eta^5$-2,3,4,6-tetramethylindenyl)-silanetitanium (II) 1,4-diphenyl-1,3-butadiene,
(t-butylamido)dimethyl($\eta^5$-2,3,4,6-tetramethylindenyl) silanetitarium (II) 1,3-pentadiene,
(t-butylamido)dimethyl($\eta^5$-2,3,4,6-tetramethylindenyl)-silanetitanium (III) 2-(N,N-dimethylamino)benzyl,
(t-butylamido)dimethyl($\eta^5$-2,3,4,6-tetramethylindenyl) silanetitanium (IV) dimethyl,
(t-butylamido)dimethyl($\eta^5$-2,3,4,6-tetramethylindenyl) silanetitanium (IV) dibenzyl,
(n-butylamido)diisopropoxy($\eta^5$-2,3,4,6-tetramethyl-indenyl)silane-titanium (II) 1,4-diphenyl-1,3-butadiene,
(n-butylamido)diisopropoxy($\eta^5$-2,3,4,6-tetramethylindenyl) silane-titanium (II) 1,3-pentadiene,
(n-butylamido)diisopropoxy($\eta^5$-2,3,4,6-tetramethylindenyl)-silanetitanium (III) 2-(N,N-dimethylamino)benzyl,
(n-butylamido)diisopropoxy($\eta^5$-2,3,4,6-tetramethylindenyl) silane-titanium (IV) dimethyl,
(n-butylamido)diisopropoxy($\eta^5$-2,3,4,6-tetramethylindenyl) silane-titanium (IV) dibenzyl,
(cyclododecylamido)diisopropoxy($\eta^5$-2,3,4,6-tetramethyl-indenyl)-silanetitanium (II) 1,4-diphenyl-1,3-butadiene,
(cyclododecylamido)diisopropoxy($\eta^5$-2,3,4,6-tetramethylindenyl)silanetitanium (II) 1,3-pentadiene,
(cyclododecylamido)diisopropoxy(-2,3,4,6-tetramethylindenyl)silanetitanium (III) 2-(N,N-dimethylamino)benzyl,
(cyclododecylamido)diisopropoxy($\eta^5$-2,3,4,6-tetramethylindenyl)silanetitanium (IV) dimethyl,
(cyclododecylamido)diisopropoxy($\eta^5$-2,3,4,6-tetramethylindenyl)silanetitanium (IV) dibenzyl,
(2,4,6-trimethylanilido)diisopropoxy($\eta^5$-2,3,4,6-tetramethylindenyl)silanetitanium (II) 1,4-diphenyl-1,3-butadiene,
(2,4,6-trimethylanilido)diisopropoxy($\eta^5$-2,3,4,6-tetramethylindenyl)silanetitanium (II) 1,3-pentadiene,
(2,4,6-trimethylanilido)diisopropoxy($\eta^5$-2,3,4,6-tetramethylindenyl)silanetitanium (III) 2-(N,N-dimethylamino)benzyl,
(2,4,6-trimethylanilido)diisopropoxy($\eta^5$-2,3,4,6-tetramethylindenyl)silanetitanium (IV) dimethyl,
(2,4,6-trimethylanilido)diisopropoxy($\eta^5$-2,3,4,6-tetramethylindenyl)silanetitanium (IV) dibenzyl,
(1-adamantylamido)diisopropoxy($\eta^5$-2,3,4,6-tetramethyl-indenyl)silanetitanium (II) 1,4-diphenyl-1,3-butadiene,
(1-adamantylamido)diisoprbpoxy($\eta^5$-2,3,4,6-tetramethylindenyl)silanetitanium (II) 1,3-pentadiene,
(1-adamantylamido)diisopropoxy($\eta^5$-2,3,4,6-tetramethylindenyl)silanetitanium (III) 2-(N,N-dimethylamino)benzyl,
(1-adamantylamido)diisopropoxy($\eta^5$-2,3,4,6-tetramethylindenyl)silanetitanium (IV) dimethyl,
(1-adamantylamido)diisopropoxy($\eta^5$-2,3,4,6-tetramethylindenyl)silanetitanium (IV) dibenzyl,
(n-butylamido)dimethoxy($\eta^5$-2,3,4,6-tetramethylindenyl) silanetitanium (II) 1,4-diphenyl-1,3-butadiene,
(n-butylamido)dimethoxy($\eta^5$-2,3,4,6-tetramethylindenyl) silanetitanium (II) 1,3-pentadiene,
(n-butylamido)dimethoxy($\eta^5$-2,3,4,6-tetramethylindenyl) silanetitanium (III) 2-(N,N-dimethylamino)benzyl,
(n-butylamido)dimethoxy($\eta^5$-2,3,4,6-tetramethylindenyl) silanetitanium (IV) dimethyl,
(n-butylamido)dimethoxy($\eta^5$-2,3,4,6-tetramethylindenyl) silanetitanium (IV) dibenzyl,
(cyclododecylamido)dimethoxy($\eta^5$-2,3,4,6-tetramethylindenyl)silanetitanium (II) 1,4-diphenyl-1,3-butadiene,
(cyclododecylamido)dimethoxy($\eta^5$-2,3,4,6-tetramnethylindenyl)silanetitanium (II) 1,3-pentadiene,
(cyclododecylamido)dimethoxy($\eta^5$-2,3,4,6-tetramethylindenyl)silanetitanium (III) 2-(N,N-dimethylamino)benzyl,
(cyclododecylamido)dimethoxy($\eta^5$-2,3,4,6-tetramethylindenyl)silanctitanium (IV) dimethyl,
(cyclododecylamido)dimethoxy($\eta^5$-2,3,4,6-tetramethylindenyl)silanetitanium (IV) dibenzyl,
(2,4,6-trimethylanilido)dimethoxy($\eta^5$-2,3,4,6-tetramethylindenyl)silanetitanium (II) 1,4-diphenyl-1,3-butadiene,
(2,4,6-trimethylanilido)dimethoxy($\eta^5$-2,3,4,6-tetramethylindenyl)silanetitanium (II) 1,3-pentadiene,
(2,4,6-trimethylanilido)dimethoxy($\eta^5$-2,3,4,6-tetramethylindenyl)silanetitanium (III) 2-(N,N-dimethylamino)benzyl,
(2,4,6-trimethylanilido)dimethoxy($\eta^5$-2,3,4,6-tetramethylindenyl)silanetitanium (IV) dimethyl, (2,4,6-trimethylanilido)dimethoxy(η⁵-2,3,4,6-tetramethylindenyl)silanetitanium (IV) dibenzyl,
(1-adamantylamido)dimethoxy(η⁵-2,3,4,6-tetramethylindenyl)silanetitanium (II) 1,4-diphenyl-1,3-butadiene,
(1-adamantylamido)dimethoxy(η⁵-2,3,4,6-tetramethylindenyl)silanetitanium (II) 1,3-pentadiene,
(1-adamantylamido)dimethoxy(η⁵-2,3,4,6-tetramethylindenyl)silanetitanium (III) 2-(N,N-dimethylamino)benzyl,
(1-adamantylamido)dimethoxy(η⁵-2,3,4,6-tetramethylindenyl)silanetitanium (IV) dimethyl,
(1-adamantylamido)dimethoxy(η⁵-2,3,4,6-tetramethylindenyl)silanetitanium (IV) dibenzyl,
(n-butylamido)ethoxymethyl(η⁵-2,3,4,6-tetramethylindenyl)silanetitanium (II) 1,4-diphenyl-1,3-butadiene,
(n-butylamido)ethoxymethyl(η⁵-2,3,4,6-tetramethylindenyl)silanetitanium (II) 1,3pentadiene,
(n-butylamido)ethoxymethyl(η⁵-2,3,4,6-tetramethylindenyl)silanetitanium (III) 2-(N,N-dimethylamino)benzyl,
(n-butylamido)ethoxymethyl(η⁵-2,3,4,6-tetramethylindenyl)silanetitanium (IV) dimethyl,
(n-butylamido)ethoxymethyl(η⁵-2,3,4,6-tetramethylindenyl)silanetitanium (IV) dibenzyl,
(cyclododecylamido)ethoxymethyl(η⁵-2,3,4,6-tetramethylindenyl)silanetitanium (II) 1,4-diphenyl-1,3-butadiene,
(tyclododecylamido)ethoxymethyl(η⁵-2,3,4,6-tetramethylindenyl)silanetitanium (II) 1,3-pentadiene,
(cyclododecylamido)ethoxymethyl(η⁵-2,3,4,6-tetramethylindenyl)silanetitanium (III) 2-(N,N-dimethylamino)benzyl,
(cyclododecylamido)ethoxymethyl(η⁵-2,3,4,6-tetramethylindenyl)silanetitanium (IV) dimethyl,
(cyclododecylamido)ethoxymethyl(η⁵-2,3,4,6-tetramethylindenyl)silanetitanium (IV) dibenzyl,
(2,4,6-trimethylanilido)ethoxymethyl(η⁵-2,3,4,6-tetramethylindenyl)silanetitanium (II) 1,4-diphenyl-1,3-butadiene,
(2,4,6-trimethylanilido)ethoxymethyl(η⁵-2,3,4,6-tetramethylindenyl)silanetitanium (II) 1,3-pentadiene,
(2,4,6-trimethylanilido)ethoxymethyl(η⁵-2,3,4,6-tetramethylindenyl)silanetitanium (III) 2-(N,N-dimethylamino)benzyl,
(2,4,6-trimethylanilido)ethoxymethyl(η⁵-2,3,4,6-tetramethylindenyl)silanetitanium (IV) dimethyl,
(2,4,6-trimethylanilido)ethoxymethyl(η⁵-2,3,4,6-tetramethylindenyl)silanetitanium (IV) dibenzyl,
(1-adamantylamido)ethoxymethyl(η⁵-2,3,4,6-tetramethylindenyl)silanetitanium (II) 1,4-diphenyl-1,3-butadiene,
(1-adamantylamido)ethoxymethyl(η⁵-2,3,4,6-tetramethylindenyl)silanetitanium (II) 1,3-pentadiene,
(1-adamantylamido)ethoxymethyl(η⁵-2,3,4,6-tetramethylindenyl)silanetitanium (III) 2-(N,N-dimethylamino)benzyl,
(1-adamantylamido)ethoxymethyl(η⁵-2,3,4,6-tetramethylindenyl)silanetitanium (IV) dimethyl, and
(1-adamantylamido)ethoxymethyl(η⁵-2,3,4,6-tetramethylindenyl)silanetitanium (IV) dibenzyl.

2,3,4,6,7-pentamethylinienyt complexes (t-butylamido)dimethyl(η⁵-2,3,4,6,7-pentamethyl-indenyl)silanetitanium (II) 1,4-diphenyl-1,3-butadiene,
(t-butylamido)dimethyl(η⁵-2,3,4,6,7-pentamethylindenyl)silanetitanium (II) 1,3-pentadiene,
(t-butylamido)dimethyl(η⁵-2,3,4,6,7-pentamethylindenyl)silanetitanium (III) 2-(N,N-dimethylamino)benzyl,
(t-butylamido)dimethyl(η⁵2,3,4,6,7-pentamethylindenyl)silanetitanium (IV) dimethyl,
(t-butylamido)dimethyl(η⁵-2,3,4,6,7-pentamethylindenyl)silanetitanium (IV) dibenzyl,
(n-butylamido)dimethyl(η⁵-2,3,4,6,7-pentamethyl-indenyl)silanetitanium (II) 1,4-diphenyl-1,3-butadiene,
(n-butylamido)dimethyl(η⁵-2,3,4,6,7-pentamethylindenyl)silanetitanium (II) 1,3-pentadiene,
(n-butylamido)dimethyl(η⁵-2,3,4 6,7-pentamethylindenyl)-silanetitanium (III) 2-(N,N-dimrthylamino)benzyl,
(n-butylamido)dimethyl(η⁵-2,3,4,6,7-pentamethylindenyl)silanetitanium (IV) dimethyl,
(n-butylamido)dimethyl(η⁵-2,3,4,6,7-pentamethylindenyl)silanetitanium (IV) dibenzyl,
(cyclododecylamido)dimethyl(η⁵-2,3,4,6,7-pentamethylindenyl)silanetitanium (II) 1,4-diphenyl-1,3-butadiene,
(cyclododecylamido)dimethyl(η⁵-2,3,4,6,7-pentamethylindenyl)silanetitanium (II) 1,3-pentadiene,
(cyclododecylamido)dimethyl(η⁵-2,3,4,6,7-pentamethylindenyl)silanetitanium (III) 2-(N,N-dimethylamino)benzyl,
(cyclododecylamido)dimethyl(η⁵-2,3,4,6,7-pentamethylindenyl)silanetitanium (IV) dimethyl,
(cyclododecylamido)dimethyl(η⁵-2,3,4,6,7-pentamethylindenyl)silanetitanium (IV) dibenzyl,
(2,4,6-trimethylanilido)dimethyl(η⁵-2,3,4,6,7-pentamethylindenyl)silanetitanium (II)1,4-diphenyl-1,3-butadiene,
(2,4,6-trimethylanilido)dimethyl(η⁵-2,3,4,6,7-pentamethylindenyl)silanetitanium (II) 1,3-pentadiene,
(2,4,6-trimethylanilido)dimethyl(η⁵-2,3,4,6,7-pentamethylindenyl)silanetitanium (III) 2-(N,N-dimethylamino)benzyl,
(2,4,6-trimethylanilido)dimethyl(η⁵-2,3,4,6,7-pentamethylindenyl)silanetitanium (IV) dimethyl,
(2,4,6-trimethylanilido)dimethyl(η⁵-2,3,4,6,7-pentamethylindenyl)silanetitanium (IV) dibenzyl,
(1-adamantylamido)dimethyl(η⁵-2,3,4,6,7-pentamethylindenyl)silanetitanium (II) 1,4-diphenyl-1,3-butadiene,
(1-adamantylamido)dimethyl(η⁵-2,3,4,6,7-pentamethylindenyl)silanetitanium (II) 1,3-pentadiene,
(1-adamantylamido)dimethyl(η⁵-2,3,4,6,7-pentamethylindenyl)silanetitanium (III) 2-(N,N-dimethylamino)benzyl,
(1-adamantylamido)dimethyl(η⁵-2,3,4,6,7-pentamethylindenyl)silanetitanium (IV) dimethyl,
(1-adamantylamido)dimethyl(η⁵-2,3,4,6,7-pentamethylindenyl)silanetitanium (IV) dibenzyl,
(t-butylamido)dimethyl(η⁵-2,3,4,6,7-pentamethylindenyl)-silanetitanium (II) 1,4-diphenyl-1,3-butadiene,
(t-butylamido)dimethyl((η⁵-2,3,4,6,7-pentamethylindenyl)silanetitanium (II) 1,3-pentadiene,
(t-butylamido)dimethyl(η⁵-2,3,4,6,7-pentamethylindenyl)-silanetitanium (III) 2-(N,N-dimethylamino)benzyl,
(t-butylamido)dimethyl(η⁵-2,3,4,6,7-pentamethylindenyl)silanetitanium (IV) dimethyl,
(t-butylamido)dimethyl(η⁵-2,3,4,6,7-pentamethylindenyl)silanetitanium (IV) dibenzyl,
(n-butylainido)diisopropoxy(η⁵-2,3,4,6,7-pentamethyl-indenyl)silane-titanium (II) 1,4-diphenyl-1,3-butadiene,
(n-butylamido)diisopropoxy(η⁵-2,3,4,6,7-pentamethylindenyl)silane-titanium (II) 1,3-pentadiene,
(n-butylamido)diisopropoxy(η⁵-2,3,4,6,7-pentamethylindenyl)-silanetitanium (III) 2-(N,N-dimethylamnino)benzyl, (n-butylamido)diisopropoxy($\eta^5$-2,3,4,6,7-pentamethylindenyl)silane-titanium (IV) dimethyl,
(n-butylamido)diisopropoxy($\eta^5$-2,3,4,6,7-pentamethylindenyl)silane-titanium (IV) dibenzyl,
(cyclododecylamido)diisopropoxy($\eta^5$-2,3,4,6,7-pentamethyl-indenyl)-silanetitanium (II) 1,4-diphenyl-1,3-butadiene,
(cyclododecylamido)diisopropoxy($\eta^5$-2,3,4,6,7-pentamethylindenyl)silanetitanium (II) 1,3-pentadiene,
(cyclododecylamido)diisopropoxy(-2,3,4,6,7-pentamethylindenyl)silanetitanium (III) 2-(N,N-dimethylamino)benzyl,
(cyclododecylamido)diisopropoxy($\eta^5$-2,3,4,6,7-pentamethylindenyl)silanetitanium (IV) dimethyl,
(cyclododecylamido)diisopropoxy($\eta^5$-2,3,4,6,7-pentamethylindenyl)silanetitanium (IV) dibenzyl,
(2,4,6-trimethylanilido)diisopropoxy($\eta^5$-2,3,4,6,7-pentamethylindenyl)silanetitanium (II)1,4-diphenyl-1,3-butadiene,
(2,4,6-trimethylanilido)diisopropoxy($\eta^5$-2,3,4,6,7-pentamethylindenyl)silanetitanium (II) 1,3-pentadiene,
(2,4,6-trimethylanilido)diisopropoxy($\eta^5$-2,3,4,6,7-pentamethylindenyl)silanetitanium (III) 2-(N,N-dimethylamino)benzyl,
(2,4,6-trimethylanilido)diisopropoxy($\eta^5$-2,3,4,6,7-pentamethylindenyl)silanetitanium (IV) dimethyl,
(2,4,6-trimethylanilido)diisopropoxy($\eta^5$-2,3,4,6,7-pentamethylindenyl)silanetitanium (IV) dibenzyl,
(1-adamantylamido)diisopropoxy($\eta^5$-2,3,4,6,7-pentamethyl-indenyl)silanetitaniuwn (II) 1,4-diphenyl-1,3-butadiene,
(1-adamantylamido)diisopropoxy($\eta^5$-2,3,4,6,7-pentamethylindenyl)silanetitanium (II) 1,3-pentadiene,
(1-adamantylamido)diisopropoxy($\eta^5$-2,3,4,6,7-pentamethylindenyl)silanetitanium (III) 2-(N,N-dimethylamino)benzyl,
(1-adamantylamido)diisopropoxy($\eta^5$-2,3,4,6,7-pentamethylindenyl)silanetitanium (IV) dimethyl,
(1-adamantylamido)diisopropoxy($\eta^5$-2,3,4,6,7-pentamethylindenyl)silanetitanium (IV) dibenzyl,
(n-butylamido)dimethoxy($\eta^5$-2,3,4,6,7-pentamethylindenyl)silanetitanium (II) 1,4-diphenyl-1,3-butadiene,
(n-butylamido)dimethoxy($\eta^5$-2,3,4,6,7-pentamethylindenyl)silanetitanium (II) 1,3-pentadiene,
(n-butylamido)dimethoxy($\eta^5$-2,3,4,6,7-pentamethylindenyl)silanetitanium (III) 2-(N,N-dimethylamino)benzyl,
(n-butylamido)dimethoxy($\eta^5$-2,3,4,6,7-pentamethylindenyl)silanetitanium (IV) dimethyl,
(n-butylamido)dimethoxy($\eta^5$-2,3,4,6,7-pentamethylindenyl)silanetitanium (IV) dibenzyl,
(cyclododecylamido)dimethoxy($\eta^5$-2,3,4,6,7-pentamethylindenyl)silanetitanium (II) 1,4-diphenyl-1,3-butadiene,
(cyclododecylamido)dimethoxy($\eta^5$-2,3,4,6,7-pentamethylindenyl)silanetitanium (II) 1,3-pentadiene,
(cyclododecylamido)dimethoxy($\eta^5$-2,3,4,6,7-pentamethylindenyl)silanetitanium (III) 2-(N,N-dimethylamino)benzyl,
(cyclododecylamido)dimethoxy($\eta^5$-2,3,4,6,7-pentamethylindenyl)silanetitanium (IV) dimethyl,
(cyclododecylamido)dimethoxy($\eta^5$-2,3,4,6,7-pentamethylindenyl)silanetitanium (IV) dibenzyl,
(2,4,6-trimethylanilido)dimethoxy($\eta^5$-2,3,4,6,7-pentamethylindenyl)silanetitanium (II) 1,4-diphenyl-1,3-butadiene,
(2,4,6-trimethylanilido)dimethoxy($\eta^5$-2,3,4,6,7-pentamethylindenyl)silanetitanium (II) 1,3-pentadiene,
(2,4,6-trimethylanilido)dimethoxy($\eta^5$-2,3,4,6,7-pentamethylindenyl)silanetitanium (III) 2-(N,N-dimethylamino)benzyl,
(2,4,6-trimethylanilido)dimethoxy($\eta^5$-2,3,4,6,7-pentamethylindenyi)silanetitanium (IV) dimethyl,
(2,4,6-trimethylanilido)dimethoxy($\eta^5$-2,3,4,6,7-pentamethylindenyl)silanetitanium (IV) dibenzyl,
(1-adamantylamido)dimethoxy($\eta^5$-2,3,4,6,7-pentamethylindenyl)silanetitanium (II) 1,4-diphenyl-1,3-butadiene,
(1-adamantylamido)dimethoxy($\eta^5$-2,3,4,6,7-pentamethylindenyl)silanetitanium (II) 1,3-pentadiene,
(1-adamantylamido)dimethoxy($\eta^5$-2,3,4,6,7-pentamethylindenyl)silanetitanium (III) 2-(N,N-dimethylamino)benzyl,
(1-adamantylamido)dimethoxy($\eta^5$-2,3,4,6,7-pentamethylindenyl)silanetitanium (IV) dimethyl,
(1-adamantylamido)dimethoxy($\eta^5$-2,3,4,6,7-pentamethylindenyl)silanetitanium (IV) dibenzyl,
(n-butylamido)ethoxymethyl($\eta^5$-2,3,4,6,7-pentamethyl-indenyl)silanetitanium (II) 1,4-diphenyl-1,3-butadiene,
(n-butylamido)ethoxymethyl($\eta^5$-2,3,4,6,7-pentamethylindenyl)silanetitanium (II) 1,3-pentadiene,
(n-butylamido)ethoxymethyl($\eta^5$-2,3,4,6,7-pentamethylindenyl)silanetitanium (III) 2-(N,N-dimethylamino)benzyl,
(n-butylamido)ethoxymethyl($\eta^5$-2,3,4,6,7-pentamethylindenyl)silanetitanium (IV) dimethyl,
(n-butylamido)ethoxymethyl($\eta^5$-2,3,4,6,7-pentamethylindenyl)silanetitanium (IV) dibenzyl,
(cyclododecylamido)ethoxymethyl($\eta^5$-2,3,4,6,7-pentamethylindenyl)silanetitanium (II) 1,4-diphenyl-1,3-butadiene,
(cyclododecylamido)ethoxymethyl($\eta^5$-2,3,4,6,7-pentamethylindenyl)silanetitanium (II) 1,3-pentadiene,
(cyclododecylamido)ethoxymethyl($\eta^5$-2,3,4,6,7-pentamethylindenyl)silanetitanium (III) 2-(N,N-dimethylamino)benzyl,
(cyclododecylamido)ethoxymethyl($\eta^5$-2,3,4,6,7-pentamethylindenyl)silanetitanium (IV) dimethyl,
(cyclododecylamido)ethoxymethyl($\eta^5$-2,3,4,6,7-pentamethylindenyl)silanetitanium (IV) dibenzyl,
(2,4,6-trimethylanilido)ethoxymethyl($\eta^5$-2,3,4,6,7-pentamethylindenyl)silanetitanium (II) 1,4-diphenyl-1,3-butadiene,
(2,4,6-trimethylanilido)ethoxymethyl($\eta^5$-2,3,4,6,7-pentamethylindenyl)silanetitaniun (II) 1,3-pentadiene,
(2,4,6-trimethylanilido)ethoxymethyl($\eta^5$-2,3,4,6,7-pentamethylindenyl)silanetitanium (III) 2-(N,N-dimethylamino)benzyl,
(2,4,6-trimethylanilido)ethoxymethyl($\eta^5$-2,3,4,6,7-pentamethylindenyl)silanetitanium (IV) dimethyl,
(2,4,6-trimethylanilido)ethoxymethyl($\eta^5$-2,3,4,6,7-pentamethylindenyl)silanetitanium (IV) dibenzyl,
(1-adamantylamido)ethoxymethyl($\eta^5$-2,3,4,6,7-pentamethyl-indenyl)silanetitanium (II) 1,4-diphenyl-1,3-butadiene,
(1-adamantylatnido)ethoxymethyl($\eta^5$-2,3,4,6,7-pentamethylindenyl)silanetitanium (II) 1,3-pentadiene,
(1-adamantylamido)ethoxymethyl($\eta^5$-2,3,4,6,7-pentamethylindenyl)silanetitanium (III) 2-(N,N-dimethylamino)benzyl,
(1-adamantylamido)ethoxymethyl($\eta^5$-2,3,4,6,7-pentamethylindenyl)silanetitanium (IV) dimethyl, and
(1-adamantylamido)ethoxymethyl($\eta^5$-2,3,4,6,7-pentamethylindenyl)silanetitanium (IV) dibenzyl.

In general, the polymerization according to the present invention may be accomplished at conditions well known in the prior art for Ziegler-Natta or Kaminsky Sinn type polymerization reactions, that is, temperatures from 0 to 250° C. and pressures from atmospheric to 1000 atmospheres (100 MPa). Suspension, solution, slurry, gas phase or other polymerization process conditions may be employed if desired, however, solution polymerization process conditions, especially continuous solution polymerization process conditions, are preferred. A support may be employed but preferably the catalysts are used in a homogeneous manner, i.e. dissolved in the solvent. Of course, the active catalyst system can form in situ if the catalyst and its cocatalyst components are added directly to the polymerization process and a suitable solvent or diluent (e.g. hexane, iso-octane, etc.) including condensed monomer, are also used. Preferably the active catalyst is formed separately in a suitable solvent, e.g. in a slip stream, prior to adding it to the polymerization mixture.

As previously mentioned, the present catalyst system is particularly useful in the preparation of EP and EPDM copolymers in high yield and productivity. The process employed may be either a solution or slurry process both of which are previously known in the art. Kaminsky, *J. Poly. Sci.*, Vol. 23, pp. 2151–64 (1985) reported the use of a soluble bis(cyclopentadienyl) zirconium dimethylalumoxane catalyst system for solution polymerization of EP and EPDM elastomers. U.S. Pat. No. 5,229,478 disclosed a slurry polymerization process utilizing similar bis(cyclopentadienyl) zirconium based catalyst systems.

In general terms, it is desirable to produce such EP and EPDM elastomers under conditions of increased reactivity of the diene monomer component. The reason for this was explained in U.S. Pat. No. 5,229,478 in the following manner, which still remains true despite the advances attained in such reference. A major factor affecting production costs and hence the utility of an EPDM is the diene monomer cost. The diene is a more expensive monomer material than ethylene or propylene. Further, the reactivity of diene monomers with previously known metallocene catalysts is lower than that of ethylene and propylene. Consequently, to achieve the requisite degree of diene incorporation to produce an EPDM with an acceptably fast cure rate, it has been necessary to use a diene monomer concentration which, expressed as a percentage of the total concentration of monomers present, is in substantial excess compared to the percentage of diene desired to be incorporated into the final EPDM product. Since substantial amounts of unreacted diene monomer must be recovered from the polymerization reactor effluent for recycle the cost of production is increased unnecessarily.

Further adding to the cost of producing an EPDM is the fact that, generally, the exposure of an olefin polymerization catalyst to a diene, especially the high concentrations of diene monomer required to produce the requisite level of diene incorporation in the final EPDM product, often reduces the rate or activity at which the catalyst will cause polymerization of ethylene and propylene monomers to proceed. Correspondingly, lower throughputs and longer reaction times have been required, compared to the production of an ethylene-propylene copolymer elastomer or other a-olefin copolymer elastomer.

Advantageously, a metallocene catalyst, e.g. a monocyclopentadienyl or -indenyl metallocene, is chosen that allows for increased diene reactivity which results in the preparation of EPDM polymers in high yield. For example, the monocyclopentadienyl and indenyl metallocene catalysts, described previously, perform well in this respect. Additionally, these catalyst systems achieve the economical production of fast curing EPDM polymers with diene contents of up to 20 weight percent or higher.

As a further illustration of the solution polymerization embodiment of this invention, reference is made to the figures. Optional aspects of the embodiments described in the figures are depicted with a dashed line.

In FIG. 1, the process is illustrated as comprising two principal zones or steps, i.e. (1) polymer formation and (2) polymer recovery, and solvent and unreacted monomer recovery and recycle or disposal. In the first zone, the process reagents are admixed in proper proportion and under appropriate conditions to form the desired polymer while in the second zone, the desired polymer is separated from unreacted monomer and solvent. The polymer is recovered for storage and/or use, the solvent is recycled, and the unreacted monomers are either recycled or disposed (the choice dependent upon various factors such as monomer concentration, monomer price, etc.).

Figure 2:
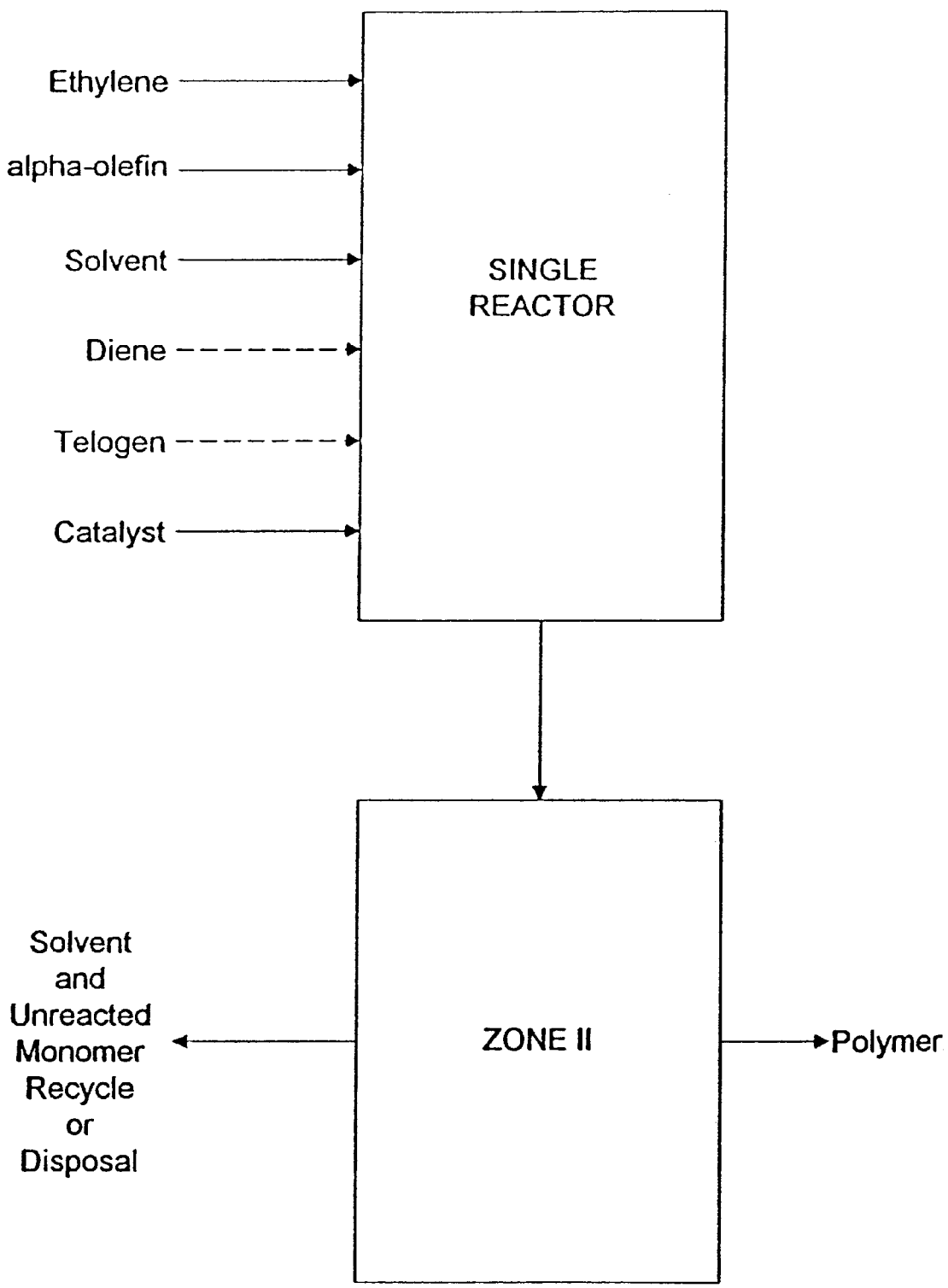
FIG. 2 is a diagramatic representation of a single reactor embodiment of Zone I of FIG. 1.

FIG. 2 illustrates a single reactor embodiment of Zone I of FIG. 1. In this embodiment, the process reagents, i.e. ethylene, one or more α-olefins, optionally one or more dienes, solvent, catalyst and optionally a molecular weight regulator (e.g. hydrogen), are fed to a single reaction vessel of any suitable design, e.g. stirred tank, loop, etc. The process reagents are contacted within the reaction vessel under appropriate conditions to form the desired polymer, and then the output of the reactor is transferred to Zone II. All of the output can be transferred at one time to Zone II (as in the case of a single pass or other batch reactor), or it can be in the form of a bleed stream which forms only a part, typically a minor part, of the reaction mass (as in the case of a continuous process reactor in which an output stream is bled from the reactor at the same rate at which reagents are added to maintain the polymerization at steady-state conditions). Recovered solvent and unreacted monomers from Zone II can be recycled back to Zone I.

Figure 3:
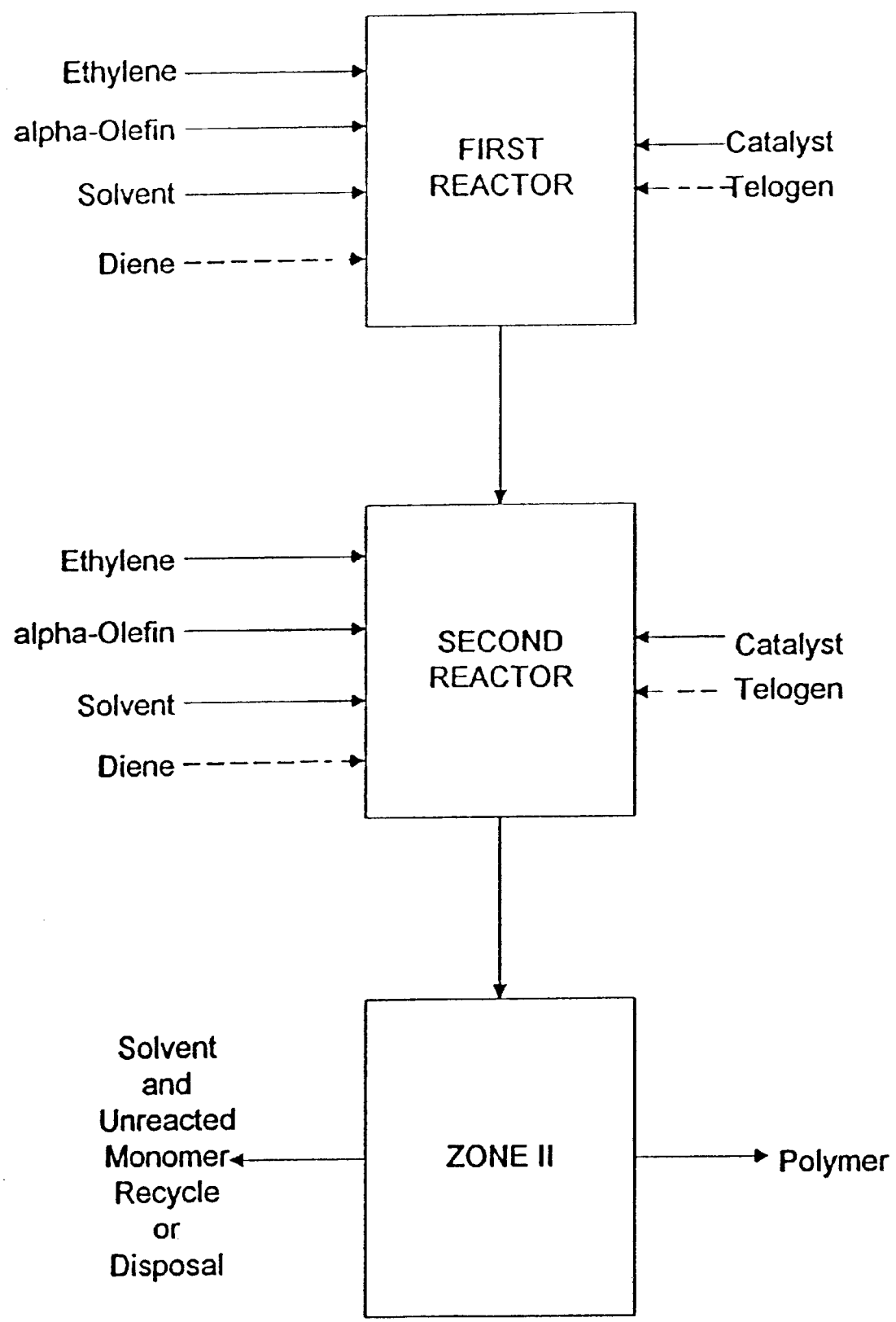
FIG. 3 is a diagrammatic representation of an in-series dual reactor configuration of Zone I of FIG. 1.

FIG. 3 illustrates a preferred embodiment of Zone I of FIG. 1 in which two reactors are configured and operated in series, i.e. the output of one reactor is fed to the second reactor. The reactors can be the same or different but preferably, each is the same and each is a loop reactor. The reactors can be operated in like or different modes, but preferably the first reactor is operated in such a manner that the formation of the high molecular weight fraction of the desired polymer is promoted while the second reactor (i.e. the reactor that receives as a feed the output from the first reactor) is operated in such a manner that the formation of the low molecular weight fraction of the desired polymer is promoted.

The temperature difference between first reactor and second reactor influences the MWD of the final product, the greater the temperature difference, the broader the MWD. While the operating temperature of each reactor will depend upon a host of factors, e.g. the α-olefin(s), the diene(s) (if any), the catalyst, the solvent, equipment and equipment design, presssure, flow rate and turbulence, the relative amounts of the reagents, desired product properties, and the like, a typical operating temperture for the first reactor is between about 65 and about 90 C. and a typical operating temperature for the second reactor is between about 85 and about 120 C. The residence time of the reactants in the individual reactors will also depend upon these factors, but a typical residence time for the reactants in each reactor is between about 2 and, about 90 minutes.

Ethylene, α-olefin, diene (if any), solvent and, optionally, hydrogen are blended by any convenient means in desired proportion, and then the blend is introduced into the first reactor, i.e. the reactor whose output is used as a feed for the other or second reactor. Catalyst is typically introduced into the first reactor apart from the other reageants. Preferably, the first and second reactors are operated on a continuous basis such that as output from the first reactor is withdrawn as feed for the second reactor, additional reagents are added to the first reactor to maintain the reaction mass in a steady-state, i.e. a relatively constant and proportional concentration of ethylene, α-olefin, diene (if any), solvent, catalyst and molecular weight regulator (if any).

The first and second reactors are in fluid communication with one another, typically connected by one or more conduits. These conduits are typically equipped with one or more mixers (to promote a homogeneous blending of the reaction mass).

As with the first reactor, ethylene, α-olefin, diene (if any), solvent and, optionally, hydrogen are blended by any convenient means in desired proportion, and then the blend is introduced into the second reactor, i.e. the reactor that receives as a feed the output from the other or first reactor. Likewise, catalyst (the same as or different from the catalyst used in the first reactor) is typically introduced into the second reactor apart from the other reageants. The output from the first reactor typically contains from about 1 to about 30 weight percent solids (i.e. polymer), and it either can be fed to the second reactor apart from the other reagents, or it can first be blended with one or more of the other reagents prior to its introduction into the second reactor. The output from the second reactor typically contains between about 8 to about 30 weight percent solids, and it is transferred to Zone II in which the desired polymer product is separated from the solvent and unreacted monomers, and the latter (i.e. solvent and unreacted monomers) are individually either recycled to Zone I or disposed in a safe and enviromentally acceptable manner.

Figure 4:
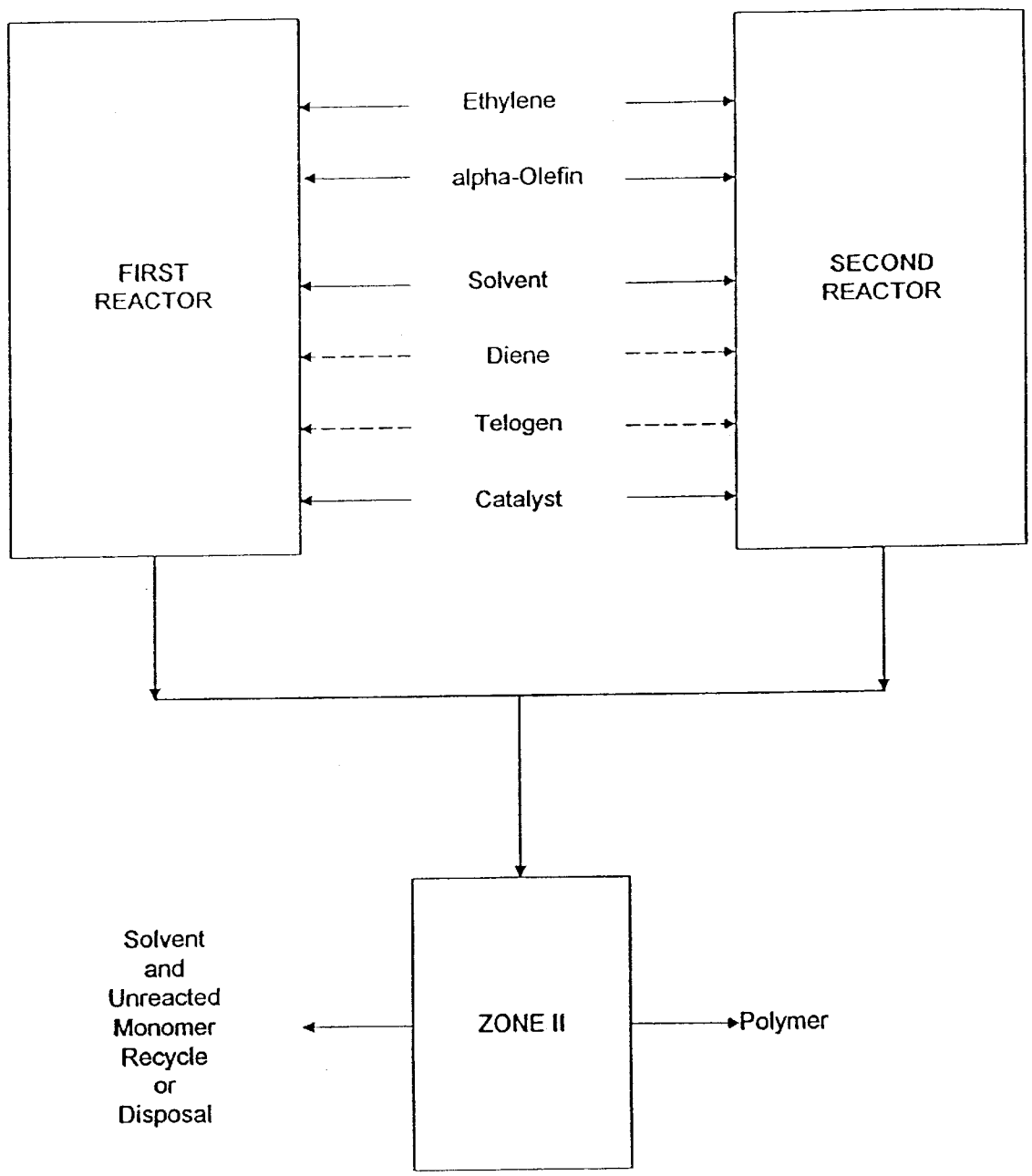
FIG. 4 is a diagramatic representation of an in-parallel dual reactor configuration of Zone I of FIG. 1.

FIG. 4 illustrates a preferred embodiment of Zone I of FIG. 1 in which two reactors are configured and operated in parallel, i.e. neither reactor produces a feed for the other reactor. Here too, the reactors can be the same or different but preferably, each is the same as the other and each is a loop reactor. The reactors can be operated in like or different modes, but preferably one reactor is operated in such a manner that the formation of the high molecular weight fraction of the desired polymer is promoted while the other reactor is operated in such a manner that the formation of the low molecular weight fraction of the desired polymer is promoted. Preferably each reactor is operated in a steady-state mode with an operating temperature and reagent residence time similar to that of the reactors configured and operated in series. Mixers, pumps and other such equipment are employed as desired.

The output from each reactor typically contains between about 1 and about 30 weight percent solids. While the output from the individual reactors can be routed separately to Zone II, typically the output from each reactor is mixed with the other prior to routing to Zone II.

Figure 5:
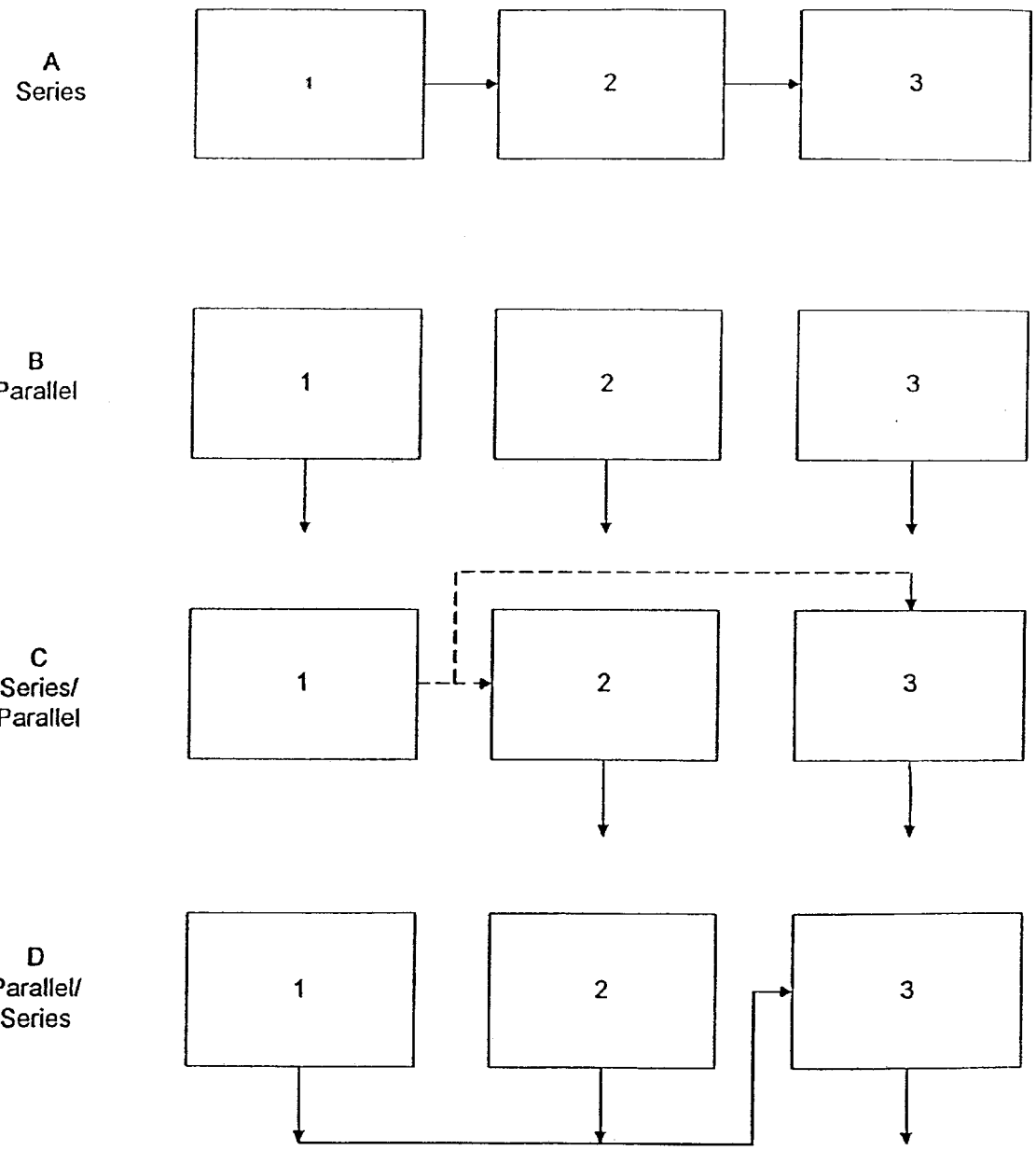
FIG. 5 is a diagramatic representation of four possible three-reactor configurations of Zone I of FIG. 1.

FIG. 5 illustrates four possible configurations for embodiments of this invention comprising three reactors. Configuration A depicts three reactors in series with the output from the first reactor serving as a feed for the second reactor, and the output from the second reactor serving as a feed for the third reactor. Configuration B depicts three reactors in parallel in which none of the reactors use as a feed the output from one of the other reactors. Configuration C depicts three reactors in which the two reactors are in series, and the two in series are in parallel with the third. Configuration D depicts three reactors in which two are in parallel, and the two in parallel are in series with the third. Similar configurations can be drawn for embodiments comprising four or more reactors.

Figure 6:
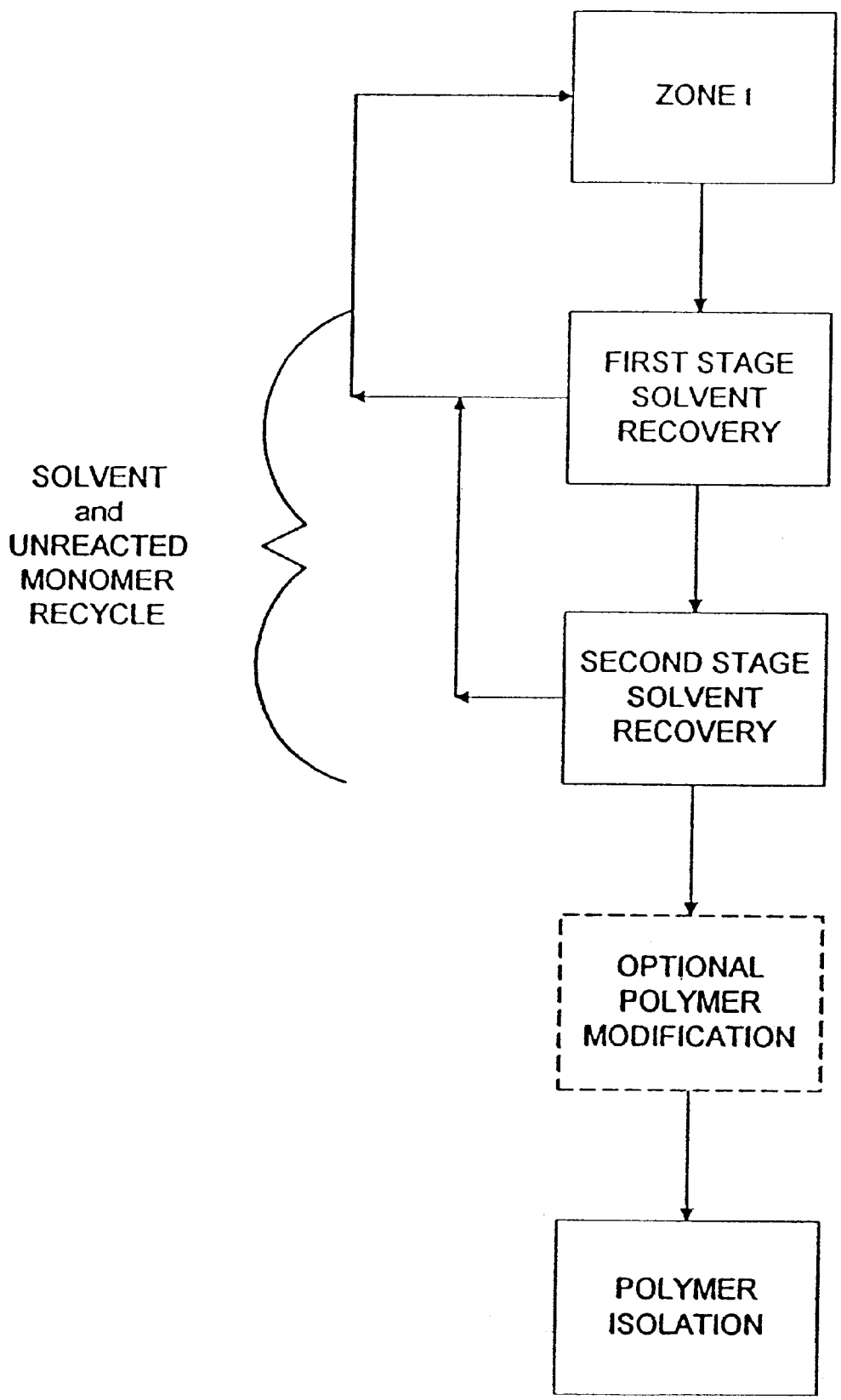
FIG. 6 is a diagramatic representation of one embodiment of Zone II of FIG. 1.

FIG. 6 illustrates one embodiment of Zone II of this invention. Reaction product, e.g. the ultimate EP or EPDM product comprising both the high and low molecular weight fractions, is removed from Zone I (which ends at the point(s) at which reaction product is no longer routed to another reactor) to a first stage solvent recovery system. The reaction product is typically between about 8 and about 30 weight percent solids, and comprises EP or EPDM copolymer, solvent, urireacted comonomers, catalyst and catalyst residue, and residual amounts of hydrogen. Recovery of the copolymer requires its separation from these other components and according to the process of this invention, this is accomplished without the use of steam stripping, i.e. essentially under anhydrous conditions (although minor amounts of water may be present in the reaction product from other sources, e.g. as a deactivator for the borane component of the catalyst).

The reaction product or product stream from Zone I is typically at a temperature between about 90 and about 120 C. (the operating temperature of the second reactor in a two reactor configuration) and for embodiments in which a flash devolatilizer is the equipment of the first stage solvent recovery zone, the temperature of this stream is preferably raised to between about 210 and about 250 C. by routing the stream through a series of heat exchangers. In the devolatilizer the product stream is subjected to a sudden pressure drop of at least about 50 percent which results in a majority of:the solvent and unreacted monomers to flash-off through for eventual separation, recycle and purification or disposal. The remaining portion of the product stream, i.e. the condensed or polymer-containing phase, is discharged, typically through a gear pump which is operated under a positive pressure (e.g. about 5 to about 100 psig), into to the second stage solvent recovery zone, e.g a vacuum extruder or other vacuum vessel, or a thermal dryer. At this point, the solids content of the product stream has increased over 100 percent, e.g. to between about 20 and about 80 weight percent.

The second stage recovery zone is operated under conditions in which the solids content of the product stream is increased to over 99 weight percent before it is transferred in a molten state to the polymer isolation zone. This zone can comprise any equipment in which the polymer product is finished for use, storage and/or shipping, e.g. a pelletizer, baler, etc.

In another embodiment of this invention, the process comprises more than two anhydrous solvent recovery operations in which the solids concentration of the final product is greater than 99 weight percent. For example, two flash vessels can be used in combination with a vacuum extruder or thermal dryer (such as that claimed in the application entitled "Polymer Recovery" in the names of Richard C. Abel et al. filed of even date herewith, the disclosure of which is incorporated herein by reference), or three flash vessels can be operated in series with at least one vessel operated under vacuum conditions.

In other embodiments of this invention, the first stage solvent recovery zone can comprise a thermal dryer or vacuum extruder and the second stage solvent recovery zone can comprise a flash devolatilizer. Alternatively, both the first and second stage solvent recovery zones can comprise a flash devolatilizer or a vacuum extruder or a thermal dryer.

In yet other embodiments of this invention, additives, modifiers and other materials can be blended with the EP or EPDM product. Certain of these materials, e.g. antioxidants, can be added directly to one or more of the reactors or to the product as it passes from one reactor to another. Typically, however, materials are not added to the product stream until after it is discharged from the last reactor through which it will pass. For example, prior to entering the heat exchangers, the product stream can be admixed with such materials as processing aids, e.g. calcium stearate, catalyst deactivators, e.g. minor amounts of water (which deactivates any remaining boron cocatalyst), antioxidants, e.g. Irganox® 1076 (a hindered phenol manufactured and sold by Ciba-Geigy Corporation), and a peroxide to promote crosslinking (which in turn promotes an increase in Mooney viscosty).

Preferred EP or EPDM products are made with a metallocene catalyst that is free of aluminum (the presence of which has a detrimental effect on certain of the product physical properties, e.g. color). Moreover due to the high efficiency of these aluminum-free catalysts, less is required and since less is required, less catalyst residue is present in the final product. In fact so little catalyst residue is present in the final product that the process of these embodiments does not require a catalyst residue removal or treatment step as is required in conventional processes. The EP and EPDM products made by the process of this invention are also substantially free of color bodies.

Fabricated articles made from EP and/or EPDM made by the process of this invention may be prepared using any conventional polyolefin processing technique. Useful articles include films (e.g., cast, blown and extrusion coated), fibers (e.g., staple fibers, spunbond fibers or melt blown fiber systems as disclosed in U.S. Pat. No. 4,340,563, 4,663,220, 4,668,566, or 4,322,027, all of which are incorporated herein by reference, and gel spun fiber systems as disclosed in U.S. Pat. No. 4,413,110 which is incorporated herein by reference), both woven and nonwoven fabrics (e.g., spunlaced fabrics disclosed in U.S. Pat. No. 3,485,706 which is incorporated herein by reference) or structures made from such fibers (including, e.g. blends of these fibers with other fibers, e.g., PET or cotton) and molded articles (e.g. made using an injection molding process, a blow molding process or a rotomoldinig process). The new polymers described herein are also useful for wire and cable coating operations, as well as in sheet extrusion for vacuum forming operations.

EXAMPLES

The polymer products of Examples 1–4 were produced in a solution polymerization process using two continuously stirred reactors operated in series. The catalyst used in these examples was formed in situ and consisted of a monocyclopentadienyl metallocene complex with titanium in the plus 4 oxidation state, trispentafluorophenyl borane activator, and modified methyl aluminoxane scavenger. The polymer products of Examples 1–4 were each stabilized with 1250 ppm calcium stearate, 1000 ppm Irganox™ 1076, and 1600 ppm PEPQ™. Irganox™ 1076 is a hindered phenol stabilizer, i.e. octadecyl-3,5-ditertiarybutyl-4-hydroxyhydrocinnamate, and PEPQ™ is a phosphonite stabilizer, i.e. tetrakis(2,4-ditertiarybutylphenol)-4,4'-biphenylene diphosphonite. Irganox is a trademark of and is made by Ciba-Geigy Corporation. PEPQ is a trademark of and is made by Sandoz. These additives were added to the second reactor exit stream.

Ethylene was introduced into a mixture of Isopar E (a mixture of $C_8$–$C_{10}$ saturated hydrocarbons made by Exxon), propylene and 5-ethylidene-2-norbornene (ENB) forming a reactor feed stream. This stream was continuously injected into the first reactor. A similar reactor feed stream was prepared for the second reactor except hydrogen was mixed with the ethylene prior to combining the ethylene with the diluent and comonomers. The reactor feed stream compositions for reactors one and two are reported in Tables 2 and 3, respectively. The polymerization reactions of Examples 1–4 were performed under steady state conditions, i.e., constant reactant concentration and continual input of solvent, monomers, and catalyst, and withdrawal of unreacted monomers, solvent and polymer. For these polymerizations, the first reactor pressure was held at about 550, and the second reactor pressure was held at about 525 psig.

After polymerization, the reactor exit stream was introduced into a flash vessel in which the solids concentration was increased by at least 100%. A portion of the unreacted monomers, i.e. ENB, ethylene and propylene, and the unused diluent were then collected and disposed, and the product exit stream from the flash vessel was then transferred to a devolatilizing extruder. The remaining unreacted monomers and unused diluent were removed and discarded, and the resulting polymer was strand chopped into pellets after being cooled in a water bath. Table 1 describes the overall process conditions:

TABLE 1

Overall process conditions

| | Example | | | |
|---|---|---|---|---|
| | 1 | 2 | 3 | 4 |
| Total ethylene conversion (%) | 77.0 | 72.9 | 52.7 | 78.1 |
| Propylene in polyethylene (mole %) | 17.72 | 19.88 | 32.78 | 38.28 |
| Propylene in polyethylene (wt. %) | 23.24 | 25.89 | 40.66 | 45.85 |
| Total propylene conversion (%) | 43.1 | 43.9 | 27.4 | 52.4 |
| Propylene/Total monomer ratio | 0.32 | 0.34 | 0.52 | 0.52 |
| ENB in polyethylene (mole %) | 0.98 | 0.93 | 0.81 | 1.08 |
| ENB in polyethylene (wt. %) | 5.69 | 5.35 | 4.43 | 5.74 |
| Total ENB conversion (%) | 27.66 | 25.53 | 14.31 | 31.27 |
| ENB/Total monomer ratio | 0.12 | 0.12 | 0.11 | 0.11 |
| Solvent + ENB + Propylene/ ethylene ratio | 9.45 | 12.10 | 13.13 | 19.83 |
| Catalyst efficiency (MMlb polymer/lb Ti) | 0.994 | 1.409 | 2.059 | 0.283 |

TABLE 2

1st reactor process conditions

| | Example | | | |
|---|---|---|---|---|
| | 1 | 2 | 3 | 4 |
| Percent of total polymer* from 1st reactor (%) | 22.9 | 30.7 | 34.1 | 20.3 |
| Ethylene conversion* 1st reactor (%) | 48.7 | 48.7 | 36.3 | 36.3 |
| Propylene in polyethylene* (mole %) | 15.24 | 15.24 | 32.06 | 32.06 |
| Propylene in polyethylene* (wt. %) | 20.20 | 20.20 | 39.87 | 39.87 |
| Propylene conversion* $1^{st}$ reactor (%) | 23.7 | 23.3 | 19.8 | 19.7 |
| Propylene/Total monomer feed ratio | 0.31 | 0.32 | 0.51 | 0.51 |
| ENB in polyethylene* (mole %) | 0.99 | 0.99 | 0.81 | 0.81 |
| ENB in polyethylene* (wt. %) | 5.80 | 5.80 | 4.46 | 4.46 |
| ENB conversion* 1st reactor (%) | 16.88 | 16.49 | 11.26 | 11.26 |
| ENB/Total monomer ratio | 0.13 | 0.13 | 0.10 | 0.10 |

TABLE 2-continued

1st reactor process conditions

| | Example | | | |
|---|---|---|---|---|
| | 1 | 2 | 3 | 4 |
| Solvent + ENB + Propylene/ethylene ratio | 11.26 | 11.03 | 14.53 | 14.54 |
| Hydrogen concentration (mole %) | 0 | 0 | 0 | 0 |
| Solids (wt. %) | 5.37 | 5.47 | 4.20 | 4.20 |
| Feed temp. (C.) | 9.9 | 10.9 | 7.1 | 7.3 |
| Reactor temp. (C.) | 82.7 | 81.6 | 69.7 | 69.2 |
| Exit temp. (C.) | 105.0 | 99.0 | 89.0 | 85.9 |
| Catalyst efficiency (MMlb polymer/lb Ti) | 2.105 | 3.231 | 3.192 | 2.124 |

TABLE 3

2d reactor process conditions

| | Example | | | |
|---|---|---|---|---|
| | 1 | 2 | 3 | 4 |
| Ethylene conversion* 2d reactor (%) | 71.8 | 64.3 | 42.2 | 73.1 |
| Propylene in polyethylene* (mole %) | 18.47 | 21.98 | 33.16 | 39.95 |
| Propylene in polyethylene* (wt. %) | 24.14 | 28.41 | 41.07 | 47.37 |
| Propylene conversion* 2d reactor (%) | 37.8 | 37.3 | 20.1 | 47.5 |
| Propylene/Total monomer fresh feed ratio | 0.33 | 0.36 | 0.53 | 0.53 |
| Propylene/Total monomer overall ratio | 0.34 | 0.37 | 0.54 | 0.54 |
| ENB in polyethylene* (mole %) | 0.97 | 0.90 | 0.80 | 1.15 |
| ENB in polyethylene* (wt. %) | 5.65 | 5.16 | 4.42 | 6.07 |
| ENB conversion* 2d reactor (%) | 22.67 | 18.62 | 9.88 | 27.70 |
| ENB/Total monomer fresh ratio | 0.12 | 0.11 | 0.12 | 0.12 |
| ENB/Total monomer overall ratio | 0.13 | 0.13 | 0.12 | 0.12 |
| Solvent + ENB + Propylene/ethylene fresh feed ratio | 8.36 | 13.16 | 11.72 | 25.18 |
| Solvent + ENB + Propylene/ethylene overall ratio | 11.70 | 15.98 | 16.04 | 24.27 |
| Hydrogen concentration (mole %) | 0.081 | 0 | 0 | 0 |
| Solids (wt. %) | 10.45 | 8.23 | 6.90 | 7.80 |
| Feed temp. (C.) | 14.3 | 14.2 | 13.8 | 7.8 |
| Reactor temp (C.) | 115.0 | 104.1 | 95.3 | 91.6 |
| Catalyst efficiency (Mmlb polymer/lb Ti) | 0.859 | 1.127 | 1.739 | 0.231 |

TABLE 4

Feed rates

| | Example | | | |
|---|---|---|---|---|
| | 1 | 2 | 3 | 4 |
| Ethylene 1st reactor (pph**) | 1.50 | 1.47 | 1.51 | 1.51 |
| Propylene 1st reactor (pph) | 0.84 | 0.84 | 1.99 | 1.99 |
| ENB 1st reactor (pph) | 0.34 | 0.34 | 0.39 | 0.39 |
| Isopar E 1st reactor (pph) | 13.90 | 13.84 | 18.60 | 18.11 |
| Hydrogen 1st reactor (sccm***) | 0 | 0 | 0 | 0 |
| Polyethylene rate* (pph) | 1.0 | 1.0 | 1.0 | 1.0 |
| Ethylene 2d reactor (pph) | 2.49 | 1.50 | 1.49 | 1.49 |
| Propylene 2d reactor (pph) | 1.49 | 1.02 | 2.29 | 2.25 |
| ENB 2d reactor (pph) | 0.55 | 0.32 | 0.50 | 0.50 |
| Isopar E 2d reactor (pph) | 17.97 | 17.97 | 14.04 | 32.97 |
| Hydrogen 2d reactor (sccm) | 9.97 | 0 | 0 | 0 |
| Polyethylene rate* (pph) | 3.3 | 2.2 | 1.9 | 3.9 |
| Additive flow (pph) | 1.2 | 0.9 | 0.8 | 0.8 |
| Catalyst 1st reactor (ml/min) | 4.92 | 3.13 | 3.23 | 4.85 |
| Borane cocatalyst 1st reactor (ml/min) | 5.43 | 3.46 | 2.69 | 4.08 |
| MMAO 1st reactor (ml/min) | 8.98 | 5.73 | 4.32 | 6.56 |
| 1st reactor borane/Ti molar ratio | 4.9 | 5.0 | 3.4 | 3.5 |
| 1st reactor MMAO/Ti molar ratio | 7.9 | 7.9 | 11.7 | 11.9 |
| Catalyst 2d reactor (ml/min) | 4.96 | 2.47 | 2.79 | 10.71 |
| Borane cocatalyst 2d reactor (ml/min) | 3.70 | 1.64 | 4.17 | 9.24 |
| MMAO 2d reactor (ml/min) | 7.00 | 3.50 | 3.90 | 4.90 |
| 2d reactor borane/Ti molar ratio | 3.0 | 3.0 | 3.0 | 3.5 |
| 2d reactor MMAO/Ti molar ratio | 3.0 | 3.0 | 3.0 | 3.0 |

*Calculated value
**pph = pounds per hour
***sccm = standard cubic centimeters per minute

What is claimed is:

1. A process for the manufacture of an ethylene/α-olefin/diene monomer elastomer having a density of from about 0.850 g/cm³ to about 0.895 g/cm³, the process comprising the steps of:

A. contacting in a first reactor (1) ethylene, (2) at least one $C_3$–$C_{20}$ aliphatic α-olefin, (3) at least one $C_4$–$C_{20}$ diene, (4) an activated catalyst comprising a Group 4 metal metallocene complex, and (5) a solvent, the first reactor operated such that a first elastomeric product is produced at a polymer concentration of from about 1 to about 15 weight percent, based on the weight of the reaction mass in the first reactor;

B. contacting in a second reactor (1) ethylene, (2) at least one $C_3$–$C_{10}$ aliphatic α-olefin, (3) at least one $C_4$–$C_{20}$ diene, (4) an activated catalyst comprising a Group 4 metal metallocene complex, (5) a solvent, and (6) a product stream from the first reactor, the second reactor operated such that a second elastomeric product is produced at a polymer concentration of from about 2 to about 30 weight percent, based on the weight of the reaction mass in the second reactor;

C. removing an elastomeric product stream from the second reactor;

D. removing solvent from the elastomeric product stream of the second reactor in an anhydrous, first stage solvent recovery operation such that the polymer concentration of the elastomeric product stream is increased by at least about 100 percent; and E. removing additional solvent in an anhydrous, second stage solvent recovery operation from the elastomeric product of the first stage solvent recovery operation such that the polymer concentration of the elastomeric product stream is in excess of 65 weight percent;

the metallocene complex of steps A and B corresponding to the formula:

$$ZLMX_pX'_q$$

in which

M is a metal of Group 4 of the Periodic Table of the Elements having an oxidation state of +2, +3 or +4 bound in an $\eta^5$ bonding mode to L;

L is a cyclopentadienyl-, indenyl-, tetrahydroindenyl-, fluorenyl-, tetrahydrofluorenyl-, or octahydrofluorenyl- group covalently substituted with at least a divalent moiety, Z, and L further may be substituted with from 1 to 8 substituents independently selected from the group consisting of hydrocarbyl, halo, halohydrocarbyl, hydrocarbyloxy, dihydrocarbylamine, dihydrocarbylphosphino or silyl groups, the substituent containing up to 20 nonhydrogen atoms;

Z is a divalent moiety bound to both L and M via σ-bonds, said Z comprising boron, or a member of Group 14 of the Periodic Table of the Elements, and optionally, also comprising nitrogen, phosphorus, sulfur or oxygen;

X is an anionic or dianionic ligand group having up to 60 atoms exclusive of the class of ligands that are cyclic, delocalized, π-bound ligand groups:

X' independently each occurrence is a neutral Lewis base ligating compound having up to 20 atoms;

p is 0, 1 or 2, and is two less than the formal oxidation state of M, with the proviso that when X is a dianionic ligand group, p is 1; and q is 0, 1 or 2.

2. The process of claim 1 including the additional step of theologically modifying the elastomeric product of the second reactor at a point after the first stage solvent recovery operation.

3. The process of claim 1 in which the elastomer has (a) a polydispersity of between about 1.5 to about 15, and (b) a weight average molecular weight of between about 10,000 and about 1,000,000.

4. The process of claim 3 in which the elastomer comprises, based on the weight of the elastomer, at least about 30 weight percent ethylene, at least about 15 weight percent of a $C_3$–$C_{20}$ aliphatic α-olefin, and at least about 0.1 weight percent of at least one $C_4$–$C_{20}$ diene.

5. The process of claim 4 in which the elastomer comprises, based on the weight of the polymer, less than about 85 weight percent ethylene, and less than about 20 weight percent of at least one $C_4$–$C_{20}$ diene.

6. The process of claim 5 in which the $C_3$–$C_{20}$ aliphatic α-olefin is at least one of propene, 1-butene, 4-methyl-1-pentene, 1-hexene, 1-octene, 1-decene, 1-dodecene, 1-tetradecene, 1-hexadecene, 1-octadecene, 1-eicosene, 3-cyclohexyl-1-propene, or vinyl cyclohexane, and the $C_4$–$C_{20}$ diene is at least one of butadiene, isoprene, piperylene, 1,4-pentadiene, 1,4-hexadiene, 1,5-hexadiene, 2-methyl-1,5-hexadiene, 1,6-octadiene, 1,7-octadiene, 7-methyl-1,6-octadiene, 2,5-norbornadiene, 5-ethylidene-2-norbornene, 5-methylene-2-norbornene, or 5-vinyl-2-norbornene.

7. The process of claim 6 in which the $C_3$–$C_{20}$ aliphatic α-olefin is propene and the $C_4$–$C_{20}$ diene is at least one of 5-ethylidene-2-norbornene or piperylene.

8. The process of claim 1 in which M is titanium, zirconium or hafnium, and L is cyclopentadienyl or indenyl.

9. The process of claim 8 in which the metallocene complex is activated with a perfluorinated tri(aryl)boron compound.

10. The process of claim 9 in which the perfluorinated tri(aryl)boron compound is tris(pentafluorophenyl)borane.

11. The process of claim 1 in which the first reactor is operated at a temperature between about 65 and about 90 C., and the second reactor is operated at a temperature between about 85 and about 120 C.

12. The process claim 1 in which the polymer concentration of the elastomeric product stream of step E is increased to over 99 percent.

* * * * *